United States Patent [19]
Sahara et al.

[11] Patent Number: 5,716,068
[45] Date of Patent: Feb. 10, 1998

[54] STEERING WHEEL

[75] Inventors: Masayasu Sahara; Tadashi Yamamoto; Atsushi Nagata; Tooru Koyama, all of Aichi, Japan

[73] Assignee: Toyada Gosei Co., Ltd., Aichi-ken, Japan

[21] Appl. No.: 607,347

[22] Filed: Feb. 26, 1996

[30] Foreign Application Priority Data

| Feb. 27, 1995 | [JP] | Japan | 7-038744 |
| Feb. 27, 1995 | [JP] | Japan | 7-038745 |
| Apr. 28, 1995 | [JP] | Japan | 7-105832 |
| May 22, 1995 | [JP] | Japan | 7-122661 |

[51] Int. Cl.$^6$ ............................. B60R 21/16
[52] U.S. Cl. .................. 280/731; 280/728.2
[58] Field of Search ............ 280/731, 728.2, 280/728.1; 74/552

[56] References Cited

U.S. PATENT DOCUMENTS

| 4,899,613 | 2/1990 | Kawaguchi | 74/552 |
| 5,267,486 | 12/1993 | Niwa et al. | 280/731 X |
| 5,383,682 | 1/1995 | Nagata et al. | 280/777 |
| 5,470,099 | 11/1995 | Williams | 280/728.2 |
| 5,560,264 | 10/1996 | Xolin et al. | 280/731 X |
| 5,562,301 | 10/1996 | Lutz | 280/728.2 |
| 5,584,503 | 12/1996 | Lutz | 280/731 |

FOREIGN PATENT DOCUMENTS

| 648 661 | 4/1995 | European Pat. Off. . |
| 691 245 | 1/1996 | European Pat. Off. . |
| 63-16267 | 2/1988 | Japan . |
| 63-134368 | 6/1988 | Japan . |
| 2-24691 | 7/1990 | Japan . |
| 2-133955 | 11/1990 | Japan . |
| 5-2388 | 1/1993 | Japan . |
| 6-305427 | 11/1994 | Japan . |
| 2 192 841 | 1/1988 | United Kingdom . |
| 2 272 868 | 6/1994 | United Kingdom . |
| 95 09745 | 4/1995 | WIPO . |
| 95 23712 | 9/1995 | WIPO . |

*Primary Examiner*—Christopher P. Ellis
*Attorney, Agent, or Firm*—Cushman Darby & Cushman, IP Group Of Pillsbury Madison & Sutro LLP

[57] ABSTRACT

A steering wheel is provided with a steering wheel body, a boss core and an air bag device held by the boss core. The steering wheel body includes a core portion having a ring core and spoke cores and a cover portion covering the core portion. The cover portion includes a core cover layer covering the ring core and the spoke cores and a ceiling cover layer continuously formed with the core cover layer covering the center of the steering wheel. The boss core holds an air bag device between the boss core and the ceiling cover layer. The boss core also has a connection part that allows a steering shaft to be connected from underneath the steering wheel.

14 Claims, 25 Drawing Sheets

FIG. 18
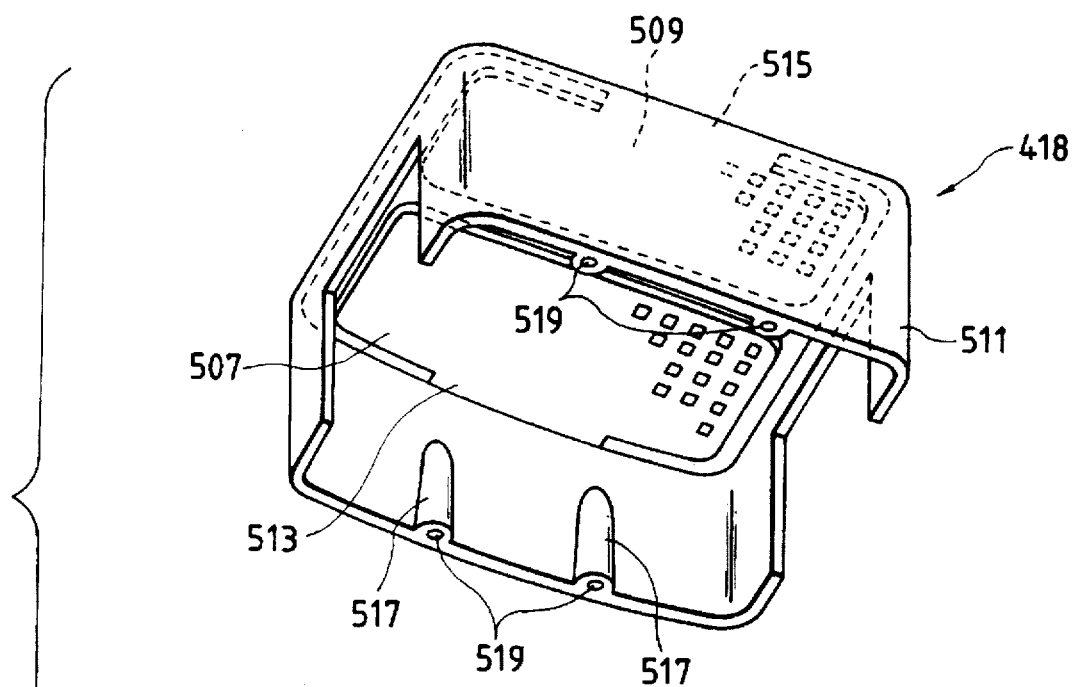
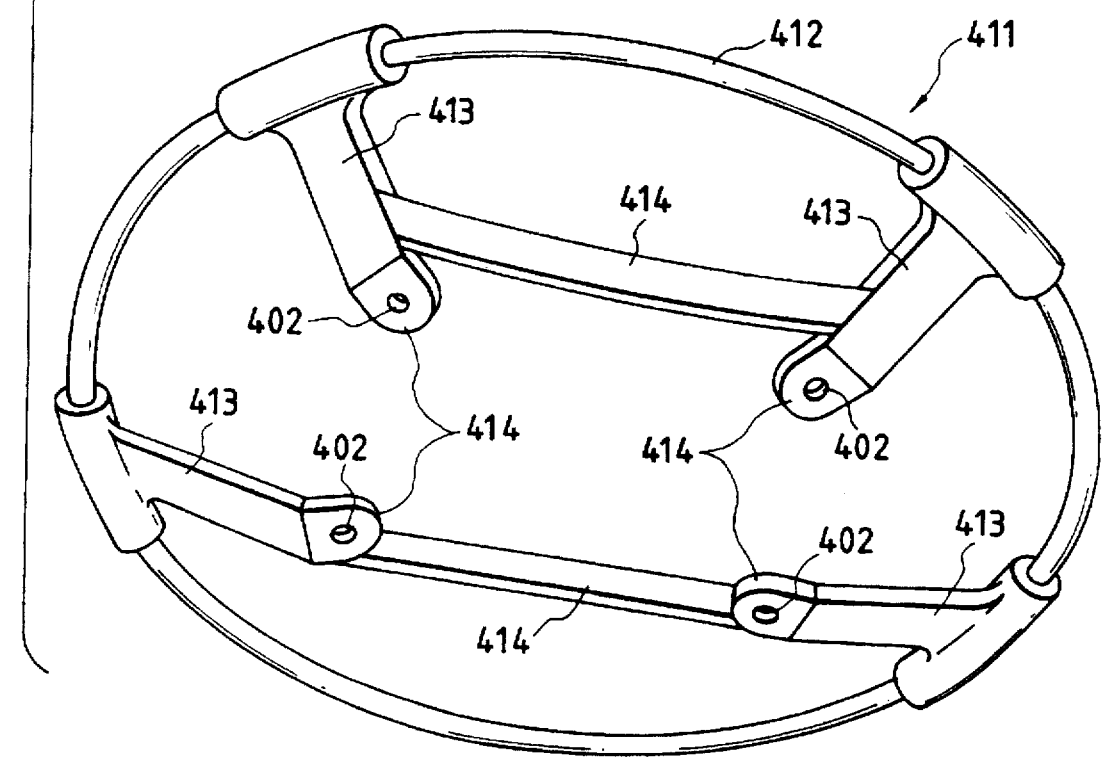

STEERING WHEEL

FIELD OF THE INVENTION

This invention relates to a steering wheel for a vehicle. More particularly, this invention relates to a steering wheel having a continuous top surface. In a steering wheel having an air bag device, this invention is also capable of absorbing an impulsive force acting on a ring portion of the steering wheel when the air bag does not deploy.

BACKGROUND OF THE INVENTION

A conventional steering wheel for a vehicle has an annular-shaped ring portion and a boss portion disposed at the center of the ring portion. The boss portion connects the steering wheel to the top end of a steering shaft. Spoke portions, radially disposed from the boss portion, connect the ring portion to the boss portion.

This conventional steering wheel has a pad containing functional parts, such as an air bag device, disposed in an upper part of the boss portion. This conventional steering wheel also has a steering wheel body comprising the ring portion, the spoke portions, and the lower part of the boss portion, as described in Japanese Patent Publication No. Hei 6-305427.

The steering wheel body has a core portion and a cover portion. The core portion provides the structural shape of the steering wheel body. The cover portion provides the exterior cover disposed on the core portion. The core portion includes a ring core providing the inner structural element of the ring portion, spoke cores providing the inner structural elements of the spoke portions, and a boss core placed in the lower part of the boss portion. The spoke cores are radially disposed from and are connected at one end to the boss core. The other ends of the spoke cores are connected to the ring core. An upper end of a steering shaft is inserted into the boss core and is retained with a nut, whereby the boss core is connected to the steering shaft.

The cover portion covers the ring core and the spoke cores and extends from the ring core to a position near the pad.

The pad contains the functional parts, such the an air bag device, and is screwed onto the spoke cores and the boss core of the steering wheel body.

The air bag device includes an air bag, folded so that it can be accommodated with the pad, an inflater to expand the air bag with gas, and a bag holder for holding the air bag and the inflater. The air bag device is attached to the steering wheel body through the bag holder.

The air bag has an opening disposed about the inflater that provides a passage to allow the gas from the inflater to flow into the air bag. The inflater includes a main unit having a gas discharge port and a flange formed on the outer peripheral surface of the main unit.

An annular retainer is disposed at the inner circumference of the opening of the air bag. The retainer includes a plurality of bolts projected downwardly that penetrate the peripheral edge of the opening of the air bag. The bolts pass through corresponding holes on the flange of the inflater and can be secured by nuts such that the air bag and the inflater are secured to the bag holder.

However, with the aforementioned conventional steering wheel, the pad, having a separate cover, is placed in the upper part of the boss portion and is attached to the steering wheel body with fixing means. Thus, a large parting line, representing a break in the boundaries between the core portion of the steering wheel body and the cover of the pad, is inevitably formed on the top face of the steering wheel, impairing the design of the steering wheel.

Moreover, accurate assembly is required so that the parting line is uniformly disposed about the periphery of the pad. Thus, strict management of the dimensional accuracy, assembly accuracy, etc., of the parts is required.

Further, to mount the steering wheel on a vehicle, two assembly steps are required. First, the steering shaft is connected to the boss core with a nut before the pad is attached. Then, the pad is attached to the steering wheel body. Therefore, it takes time to mount the steering wheel on the vehicle.

To solve these problems, the cover may be extended to cover the top surface of the steering wheel from the spoke portions to the boss portion. Further, the boss core may be formed with a connection part that allows the upper end of the a steering shaft to be connected from underneath, as described in Japanese Utility Model Publication No. Sho. 63-16267. In other words, if the cover is extended so as to cover the top surface of the steering wheel from the spoke portions to the boss portion, no parting line appears on the top face of the steering wheel. Moreover, if the boss core is formed with a connection part that allows the upper end of the steering shaft to be connected from underneath, attachment of the steering wheel to the steering shaft is accomplished simply on the bottom face of the steering wheel. Thus, the steering wheel can be connected to the steering shaft by executing one step.

However, the structure as described in Japanese Utility Model Publication No. Sho 63-16267 does not have a structure in which functional parts, such as air bag devices, are disposed inside the steering wheel. Thus, functional parts cannot be easily disposed in the boss portion.

Further, such a steering wheel is not provided with a so-called self-aligning mechanism. When an impulsive force acts on a ring portion having the self-aligning mechanism, the plane formed by the ring portion is positioned substantially orthogonal to the action direction of the impulsive force. This positioning distributes the impulsive force across a wide area that can best absorb the impulsive force. To provide the self-aligning mechanism, a plastically deformable part must be disposed between the boss core and a steering shaft, as described in Japanese Patent Publication No. Hei 4-166449.

However, to incorporate the self-aligning mechanism as described in Japanese Patent Publication No. Hei 4-166449 with an air bag device, the number of component parts, the number of assembly steps, and the costs of manufacturing the steering wheel is increased.

SUMMARY OF THE INVENTION

To solve the aforementioned problems, the present invention provides a steering wheel without a parting line on the top face of the steering wheel, enables connection to a steering shaft by one step, and allows easy incorporation of functional parts, such as an air bag device. Further, the steering wheel of the present invention uses fewer component parts and requires fewer manufacturing steps, even though it is provided with a self-aligning mechanism and an air bag device.

Accordingly, a steering wheel of the present invention comprises a ring portion, a boss portion disposed at the center of the ring portion, and spoke portions radially disposed from the boss portion connecting the ring portion to the boss portion.

The ring portion, the spoke portions, and an upper part of the boss portion defines a steering wheel body. A boss core, which holds a functional part, such as air bag device, is placed in a lower part of the boss portion.

More particularly, the steering wheel body comprises a core portion and a cover portion. The core portion provides the structural shape of the steering wheel body. The cover portion provides the exterior cover disposed on the core portion. The core portion comprises a ring core providing the inner structural element of the ring portion and spoke cores providing the inner structural elements of the spoke portions. The spoke cores are connected to the ring core. The cover portion comprises a core cover layer for covering the ring core and the spoke cores and a ceiling cover layer for covering the upper part of the boss portion. The core cover layer and the ceiling cover layer are formed as a continuous cover portion that eliminates parting lines between the portions.

The boss core holds the functional part between the boss core and the ceiling cover layer. The boss core also has a connection part disposed in a lower part of the boss core that allows an upper end of a steering shaft to be connected to the boss core from underneath the boss core. The boss core is coupled to the spoke cores by fixing means.

Further, the air bag device comprises an air bag folded so that it can be accommodated beneath the ceiling cover layer, and an inflater for supplying gas to the air bag for deploying the air bag. The inflater comprises a main unit having a gas discharge port and a flange formed on an outer peripheral surface of the main unit.

The air bag has an opening disposed about the discharge port through which discharged gas flows. When the gas flows through the bag opening and into the bag, the bag swells and breaks through the ceiling cover layer.

Further, the boss core includes a base disposed on a bottom face of the boss core for connecting the steering shaft to the steering wheel. A coupling ring portion is disposed surrounding the base and is coupled to the spoke cores. A plastically deformable deformation part is disposed between the coupling ring portion and the base. A peripheral edge of the opening of the air bag and the flange of the inflater are coupled to the coupling ring portion thereby securing the air bag device to the boss core.

A functional part, such as the air bag device, may be incorporated into the steering wheel by connecting the functional device to a coupling member embedded in the ceiling cover layer and connecting the functional device to the ring core.

In another embodiment of the steering wheel of the present invention, the boss portion is integrated into a bottom of the inflater and inflater flange. In this case, a boss core is formed on the bottom of the inflater.

The vertical direction in the specification refers to the direction along the axial direction of the steering shaft and not to the actual vertical direction when the steering wheel is mounted on a vehicle.

In the steering wheel according to the present invention, the connection part disposed on a lower part of the boss core can be connected to a steering shaft from underneath. Thus, the steering wheel can be connected to the steering shaft by executing one step.

Further, since the functional parts, such as the air bag device, are disposed and held between the boss core and the ceiling cover layer, the steering wheel can be connected to the steering shaft simply on the bottom face of the steering wheel, as described above. The functional parts can be properly disposed in the space between the ceiling cover layer and the boss core. Moreover, the functional part can be stably supported by the coupling member embedded in the ceiling cover layer.

In addition, the peripheral edge of the air bag opening and the inflater flange are coupled to the coupling ring portion of the boss core. Therefore, the air bag device can be built in the steering wheel without using a conventional bag holder, reducing the number of component parts.

If an impulsive force acts on the ring portion (as when the air bag fails to deploy), the plastically deformable deformation part can be plastically deformed, making the plane of the ring portion substantially orthogonal to the direction of the impulsive force.

In view of the foregoing, the steering wheel according to the present invention reduces the number of component parts, the number of manufacturing steps during assembly, and the cost of manufacturing the steering wheel, even though the steering wheel is provided with a self-aligning mechanism and a air bag device.

Furthermore, when the bottom of the inflater and the flange serve as the boss core, no separate installation of the inflater is required.

BRIEF DESCRIPTION OF THE DRAWINGS

FIG. 18 is an exploded perspective view of a steering wheel body of the fifth embodiment of the invention;

DETAILED DESCRIPTION OF THE PREFERRED EMBODIMENTS

1st Embodiment

Figure 1:
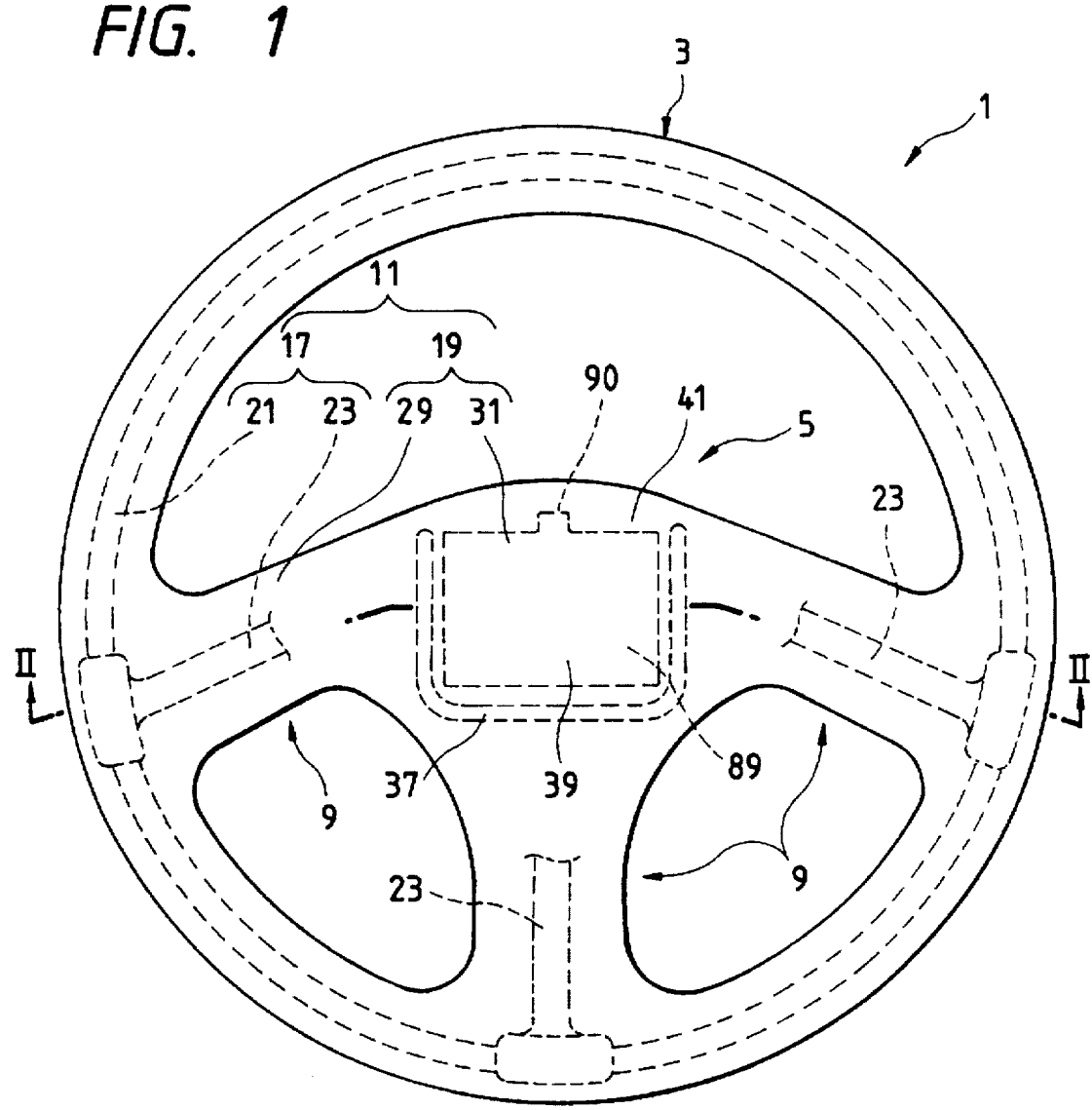
FIG. 1 is a plan view of a steering wheel of a first embodiment of the invention.
Figure 2:
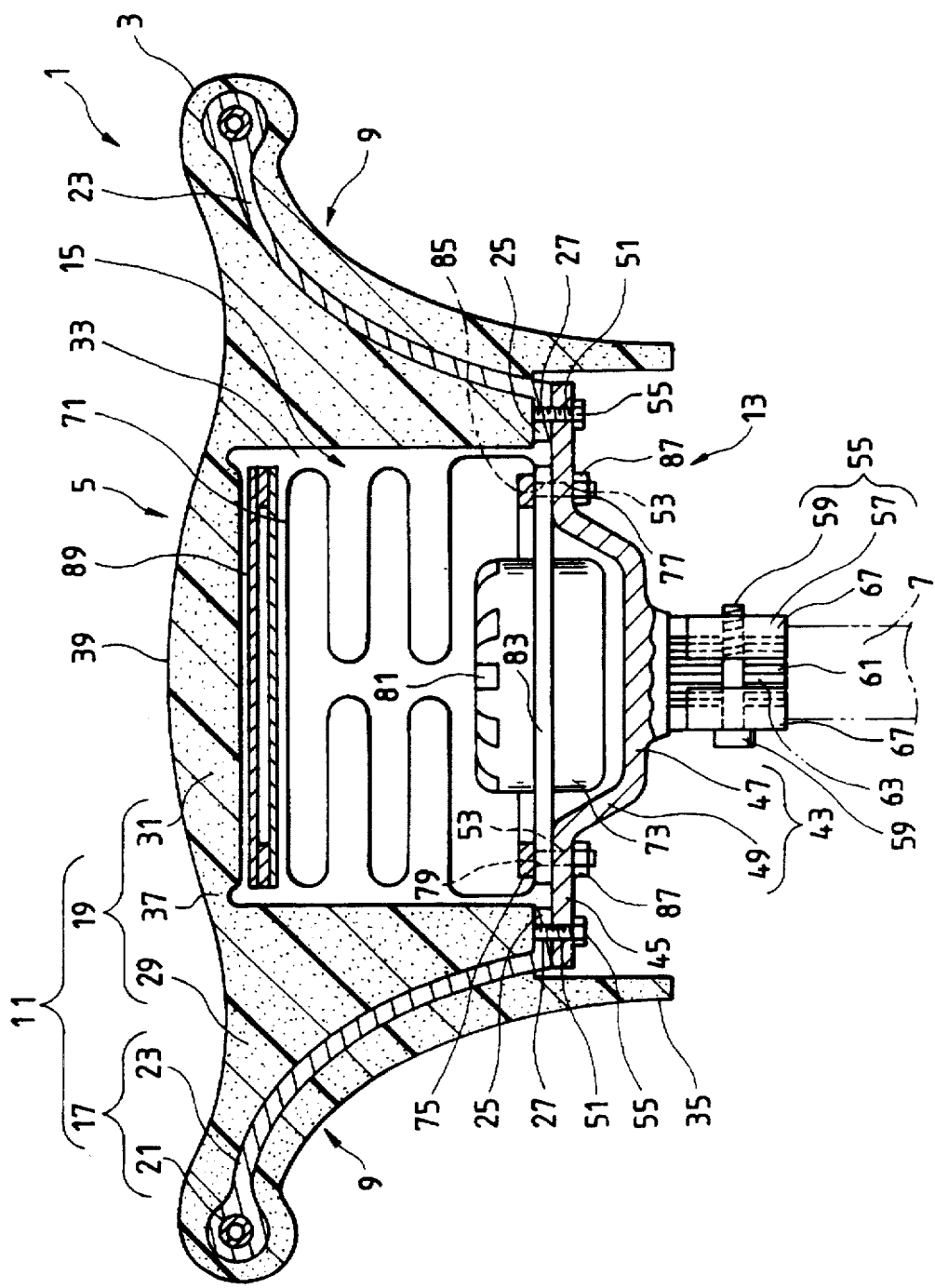
FIG. 2 is a longitudinal sectional view of the first embodiment of the invention taken along line II—II of FIG. 1.
Figure 3:
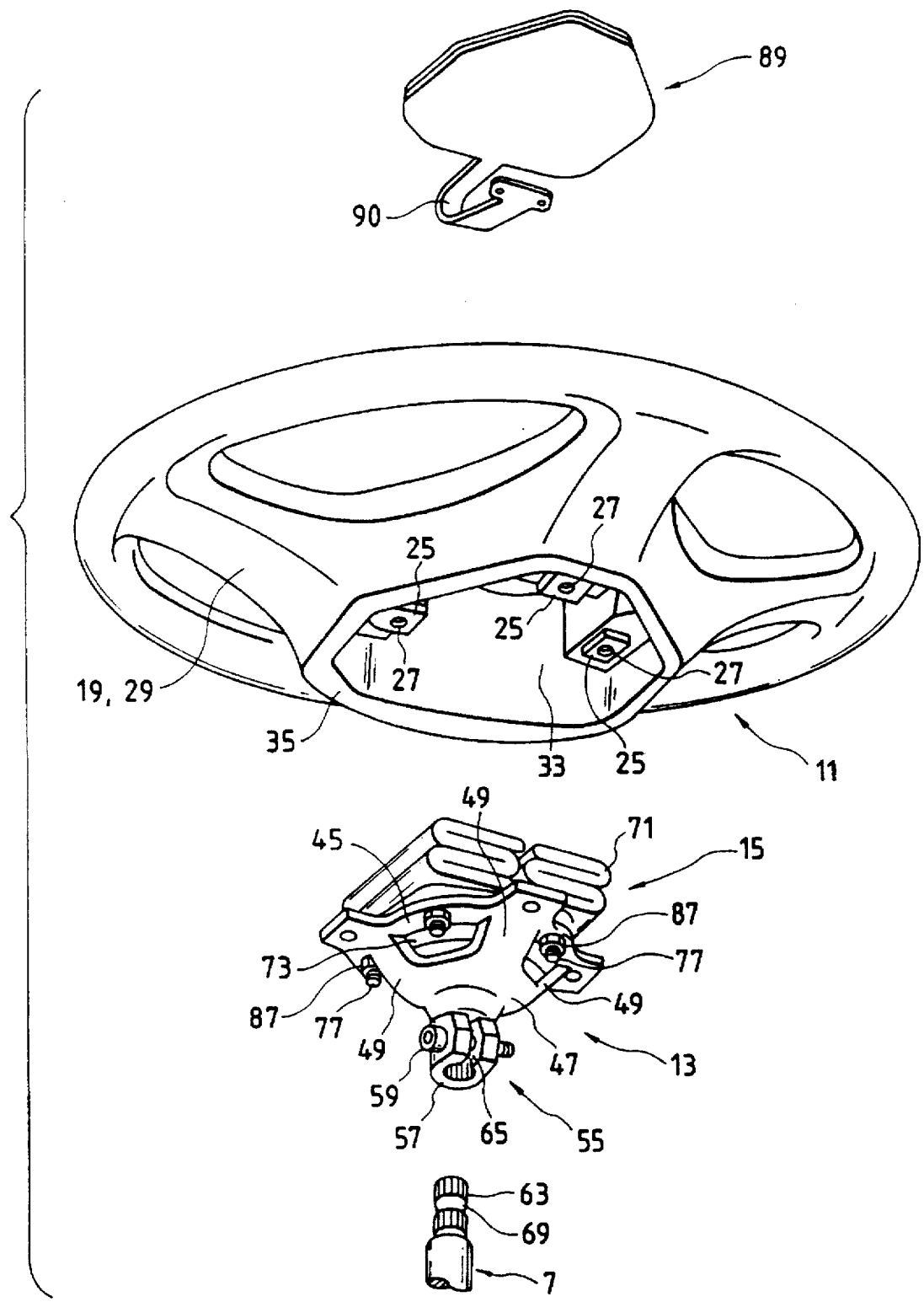
FIG. 3 is an exploded perspective view of a main part of the first embodiment of the invention.

According to a first embodiment of the present invention, a steering wheel 1 comprises an annular-shaped ring portion 3 and, a boss portion 5 disposed at the center of the ring portion 3. The boss portion 5 is adapted to be connected to a top end of a steering shaft 7. Three spoke portions 9, radially disposed from the boss portion 5, connect the ring portion 3 to the boss portion 5, as shown in FIGS. 1 to 3.

The ring portion 3, the spoke portions 9, and an upper part of the boss portion 5 define a steering wheel body 11. Finally, a boss core 13 is disposed in a lower part of the boss portion 5, and a functional part 15, such as an air bag device, is attached to the boss core 13.

More particularly, the steering wheel body 11 comprises a core portion 17 and a cover portion 19. The core portion 17 provides the structural shape of the steering wheel body. The cover portion 19 provides the exterior cover disposed on the core portion 11.

The core portion 17 includes a ring core 21 providing the inner structural element of the ring portion 3 and spoke cores 23 providing the inner structural elements of the spoke portions 9. The spoke cores 23 are radially disposed from and are connected at one end to the boss core 13. The other ends of the spoke cores 23 are connected to the ring core 21. In the first embodiment, the ring core 21 is preferably made of a steel pipe, and each spoke core 23 is made of light die-casting metal, such as an aluminum alloy. Each spoke core 23 is coupled to the ring core 21 at the time the spoke cores 23 are die cast. Each spoke core 23 is disposed slantingly downwardly from the ring core 21. An end of each spoke core 23 includes a lateral plate 25, preferably formed as an integral unit with the spoke core 23. Each of the lateral plates 25 defines a threaded fitting hole 27.

The cover portion 19 includes a core cover layer 29 covering the ring core 21 and the spoke cores 23 and a ceiling cover layer 31 covering the upper part of the boss portion 5. As shown in FIG. 2, the core cover layer 29 and the ceiling cover layer 31 are formed as a continuous layer, eliminating any parting line between the layers. The cover layers are preferably formed of a soft urethane and thermoplastic elastomer.

As shown in FIG. 2, the core cover layer 29 surrounds each of the spoke cores 23 and extends inwardly so as to define a cylindrical space inside of the spoke cores 23. The ceiling cover layer 31 joins the core cover layer 29 at a top surface of the core cover layer 29. Thus, a cylindrical housing recess 33 is defined by the core cover layer 29 and the ceiling cover layer 31.

As shown in FIG. 2, a cylindrical cover part 35, integrally formed with the core cover layer 29, is disposed on the lower peripheral edge of the core cover layer 29 and extends past the spoke cores 23 and surrounds the boss core 13. The cylindrical cover part 35 improves the design of the lower side face of the steering wheel 3.

The ceiling cover layer 31 includes an easy-to-break breaking part 37 formed in the ceiling cover layer 31. The breaking part 37 is thinner than the surrounding ceiling cover layer 31. The breaking part 37 of the ceiling cover layer 31 is constructed and arranged to shear apart under a force of an expanding air bag. Preferably, the breaking part 37 has a "U" shape. The U shape essentially defines a door 39 through which the expanding bag can pass. The thicker portion of the ceiling core layer 17 disposed above the U-shape provides a door hinge 41 about which the door 39 pivots when the air bag is deployed.

The boss core 13 includes a central base 43. A coupling ring 45 having a substantially annular shape is disposed on the top of the base 43. The coupling ring 45 can be a separate component, or as shown in FIG. 2, the coupling ring 45 can be integrally formed with the base 43.

As shown in FIG. 2, the base 43 has a substantially planar plate 47 placed at the center and three arms 49 extending upwardly from a peripheral edge of the plate 47. The arms 49 are coupled to the coupling ring 45 such that the coupling ring 45 is substantially parallel to the planar plate 47.

The coupling ring 45 is formed with fitting holes 51 and holding holes 53. The holes 51 provide the mounting point for the spoke cores 23. Bolts 55 pass through the holes 51 and are tightened into the threaded holes of the lateral plate 25 thereby securing the steering wheel body 11 to the boss core 13. Four holding holes 53 are provided at predetermined positions in the coupling ring 45 for securing the air bag device 15 to the boss core 13, as described below.

A connection part 55 is provided so that the steering shaft 7 can be connected to the boss core 13 from underneath the steering wheel. The connection part 55 is disposed on a bottom face of the plate 47 of the base 43. The connection part 55 includes a split sleeve 57 and a lock pin 59. The lock pin 59 screws through the split sleeve 57. Threads are formed at a tip of the lock pin 59 so that the split sleeve 57 can be clamped onto the shaft 7 when the lock pin 59 is tightened down.

More particularly, the split sleeve 57 includes a main unit having serrations 61 on the inner peripheral surface thereof. The serrations correspond to serrations 63 formed on the upper end of the steering shaft 7. The split sleeve 57 also includes an opening 65 axially disposed along the length of the sleeve 57. Flanges 67 projecting outwardly in a radial direction from the main unit and facing each other are disposed on either side of the opening 65. One of flanges 67 defines an insertion hole into which the lock pin 59 can be inserted. The other flange 67 is provided with a screw hole into which the threaded end of the lock pin 59 can be secured.

To connect the steering shaft 7 to the connection part 55, the upper end of the steering shaft 7 is inserted into the split sleeve 57 such that the serrations of the shaft 7 engage the serrations of the sleeve 57. The lock pin 59 is fitted through the first flange of the sleeve 57 and screwed into the threaded hole of the other flange whereby the diameter of the sleeve 57 can be reduced and clamped to the shaft 7. Preferably, the shaft 7 includes a recess groove 69 circumferentially disposed around the end of the shaft 7 that accommodates the passage of the lock pin 59 from one flange to the other flange.

The steering wheel of the present invention also includes a functional part 15. In this particular embodiment, the functional part 15 is an air bag device 15. The air bag device 15 includes a folded air bag 71 and an inflater 73 for supplying gas to expand the air bag 71. The air bag device 15 is secured to the boss core 13 by a substantially annular-shaped retainer 75 having four downwardly extending bolts 77. The air bag 71 has an opening disposed about the inflater 73 through which the gas from the inflater 73 flows. Disposed around the perimeter of the opening of the air bag 71, the air bag 71 includes insertion holes 79 into which the bolts of the retainer 75 are inserted.

The inflater 73 includes a main unit having a gas discharge port 81 on a top surface of the unit. An annular flange 83 is disposed on the outer peripheral surface of the main unit. Insertion holes 85 are formed into the flange 83 of the inflater 73 into which the bolts of the retainer 75 are inserted.

To assemble the air bag device 15 to the boss core 13, the retainer 75 is placed inside the air bag 71 such that the bolts 77 of the retainer 75 align with the insertion holes of the air bag 71. The retainer bolts 77 are passed through the insertion holes 79 of the air bag 71, the insertion holes 85 of the inflater flange 83, and the holding holes 53 of the boss core coupling ring 45. The retainer bolts 77 of the retainer 75 are secured with nuts 87, whereby the air bag device 15 is connected to the boss core 13.

The steering wheel 1 of the first embodiment preferably has a horn switch 89, also a functional part of the steering wheel, disposed between the folded air bag 71 and the ceiling cover layer 31. The horn switch 89 is constructed from a membrane switch and is connected to a horn operation circuit (not shown). A flexible tongue piece 90 connects the horn switch 89 to the ceiling cover layer 31.

To manufacture the steering wheel 1 of the first embodiment, the cover portion 19 is injection molded around the core portion 17. Following molding of the cover portion 19, the air bag device 15 is secured to the boss core 13 by the retainer 75, as described above. The air bag 71 must be folded to fit within the recess 33.

Once the air bag device is secured to the boss core 13, the steering wheel body 11 can be secured to the boss core 13. The holes 27 of the lateral plates 25 are aligned with the holes 53 of the coupling ring 45. The bolts 27 are passed through the holes 53 and are screwed into the holes 27 of the lateral plate 25, whereby the steering wheel body 11 can be attached to the boss core 13.

Further, to connect the steering wheel 1 to the steering shaft 7, the upper end of the steering shaft 7 is inserted into the split sleeve 57 when the lock pin 59 is removed. The lock pin 59 is fitted through the flanges 67 of the sleeve 57 and the diameter of the sleeve 57 is reduced, whereby the sleeve 57 is clamped to the upper end of the steering shaft 7.

The foregoing embodiment of the steering wheel 1 provides a number of advantages. First, no parting line appears on the top face of the steering wheel 1, providing a good design of the top face. Second, since the connection part 55 is placed on the underside of the boss core 13, the steering shaft 7 can be connected to the boss core 13 simply by executing one step. Finally, since the air bag device 15 is disposed and held between the boss core 13 and the ceiling cover layer 31 and the steering wheel body 11 is secured to the boss core 13, the steering wheel 1 can be assembled as a unit and then connected to the steering shaft 7 simply on the bottom face of the steering wheel 1. Therefore, a similar effect to that described in BACKGROUND OF THE INVENTION can be produced.

2nd Embodiment

Figure 4:
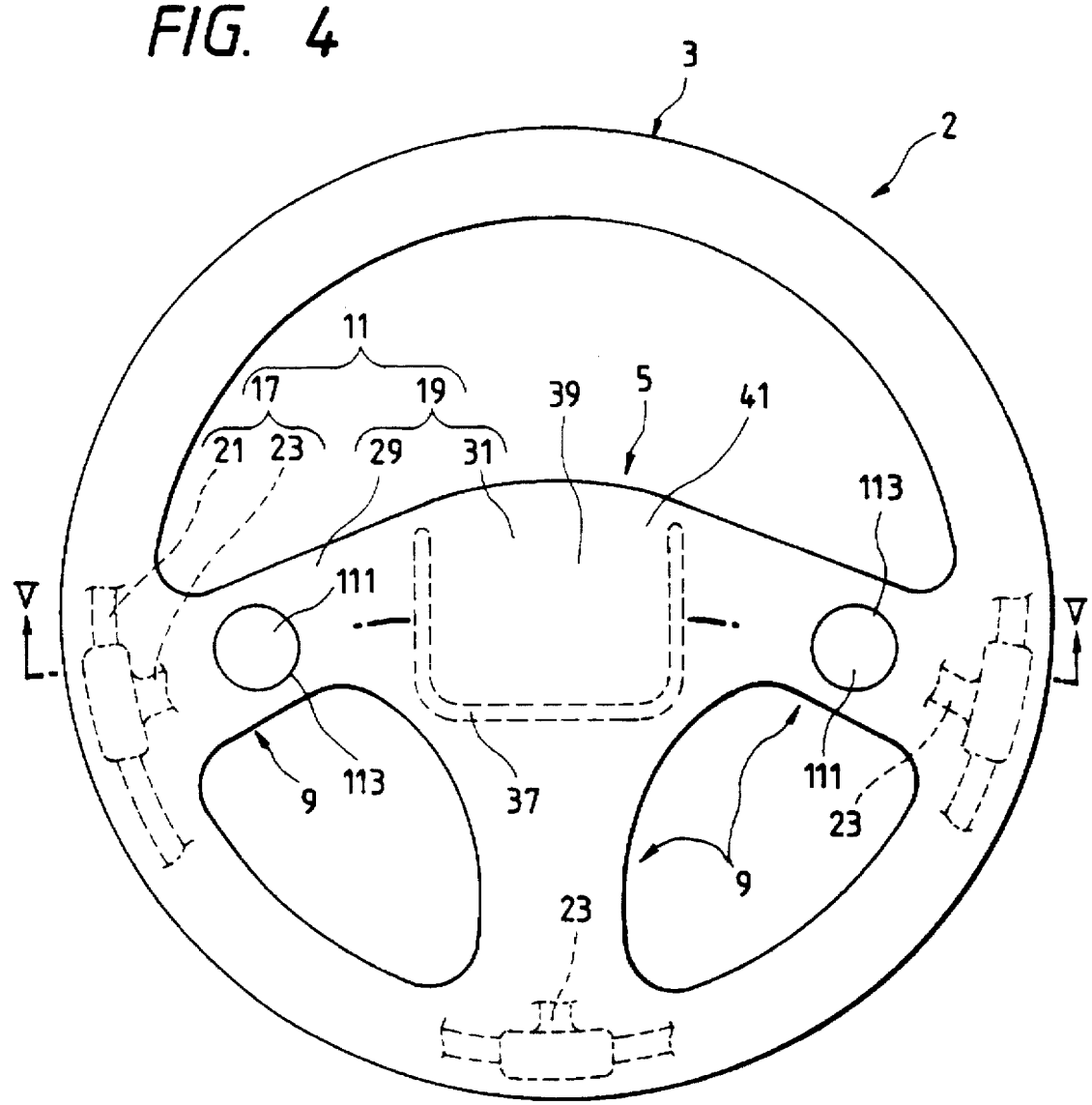
FIG. 4 is a plan view of a steering wheel of a second embodiment of the invention.
Figure 5:
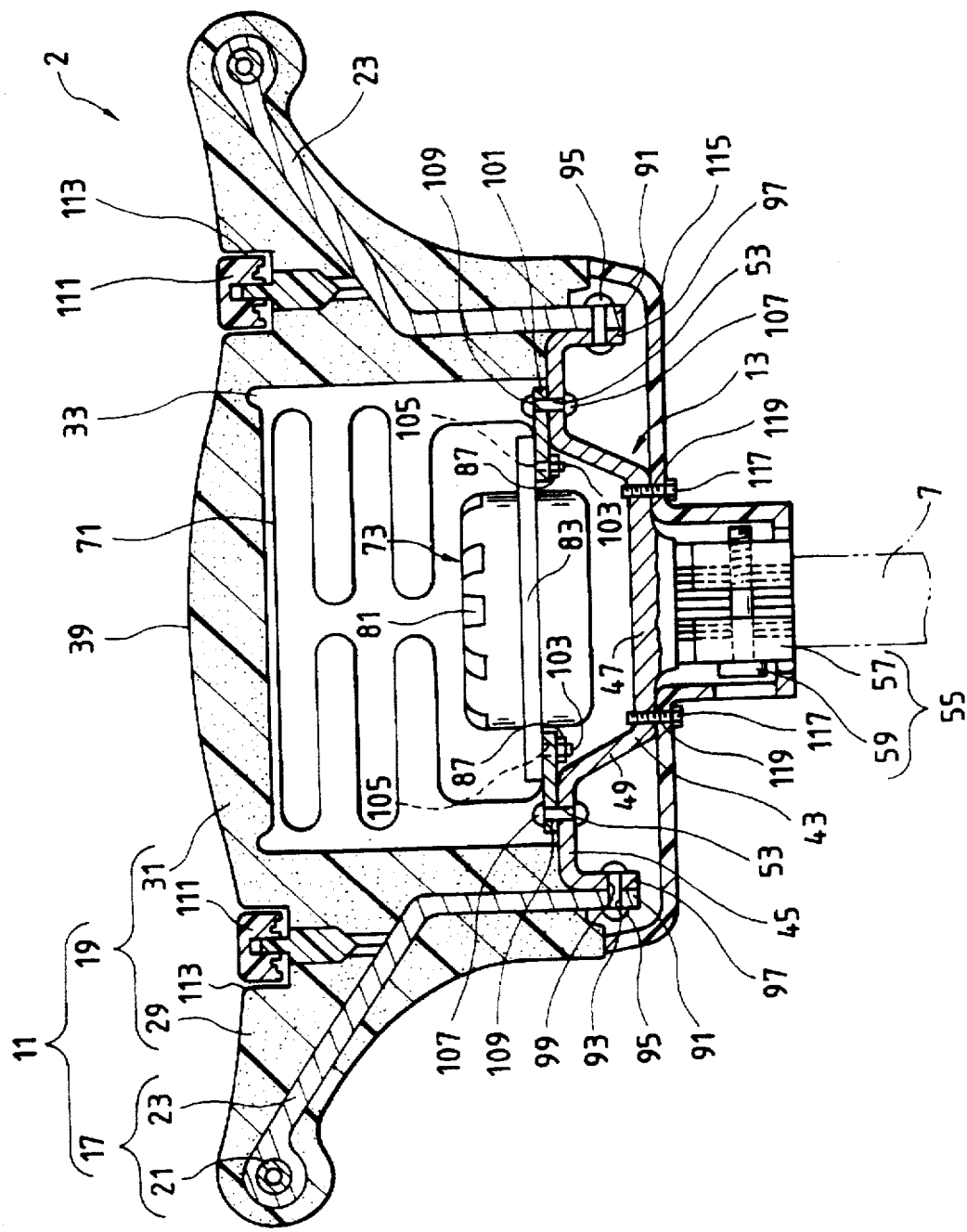
FIG. 5 is a longitudinal sectional view of the second embodiment of the invention taken along line V—V of FIG. 4.
Figure 6:
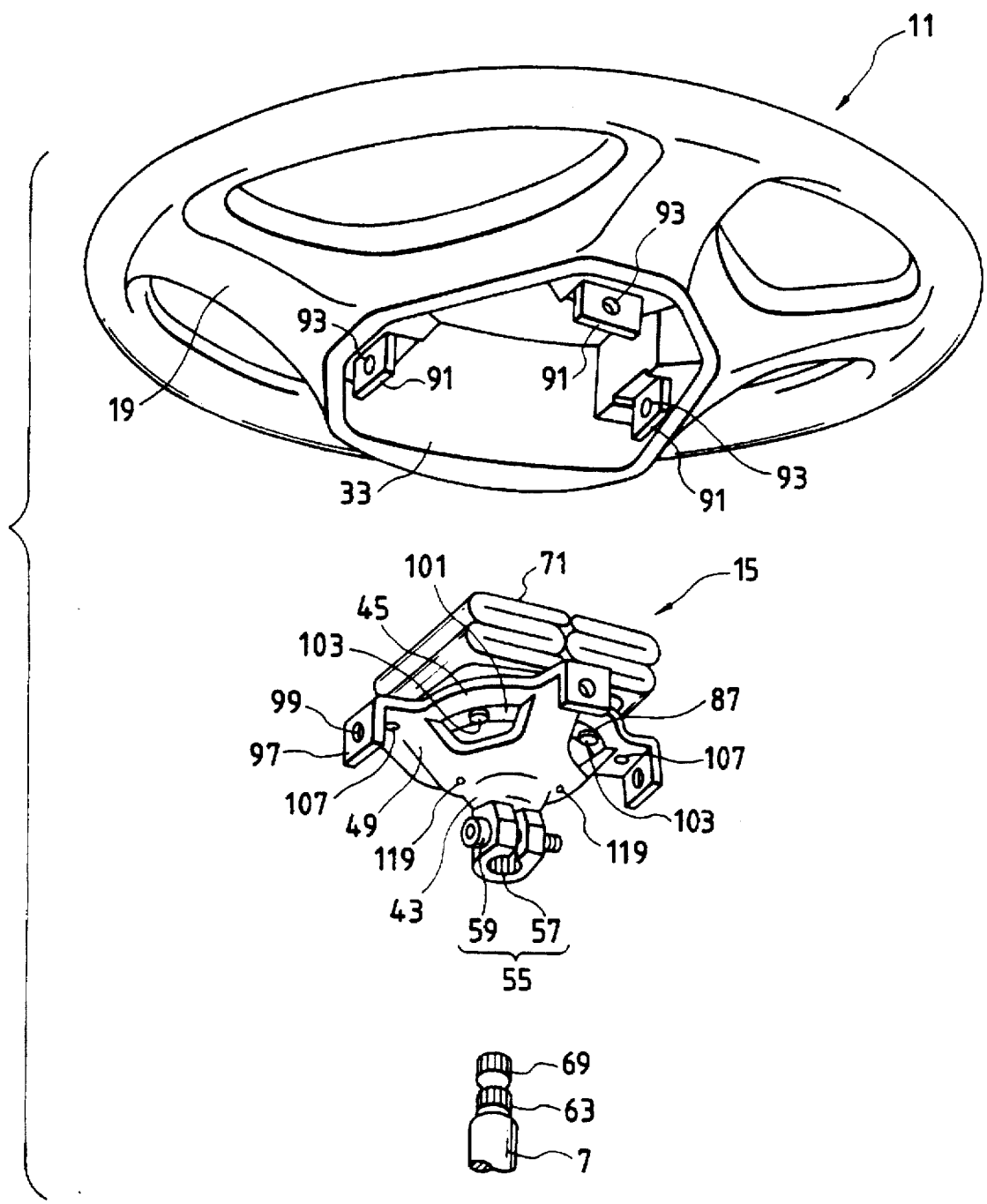
FIG. 6 is an exploded perspective view of a main part of the second embodiment of the invention.
Figure 7:
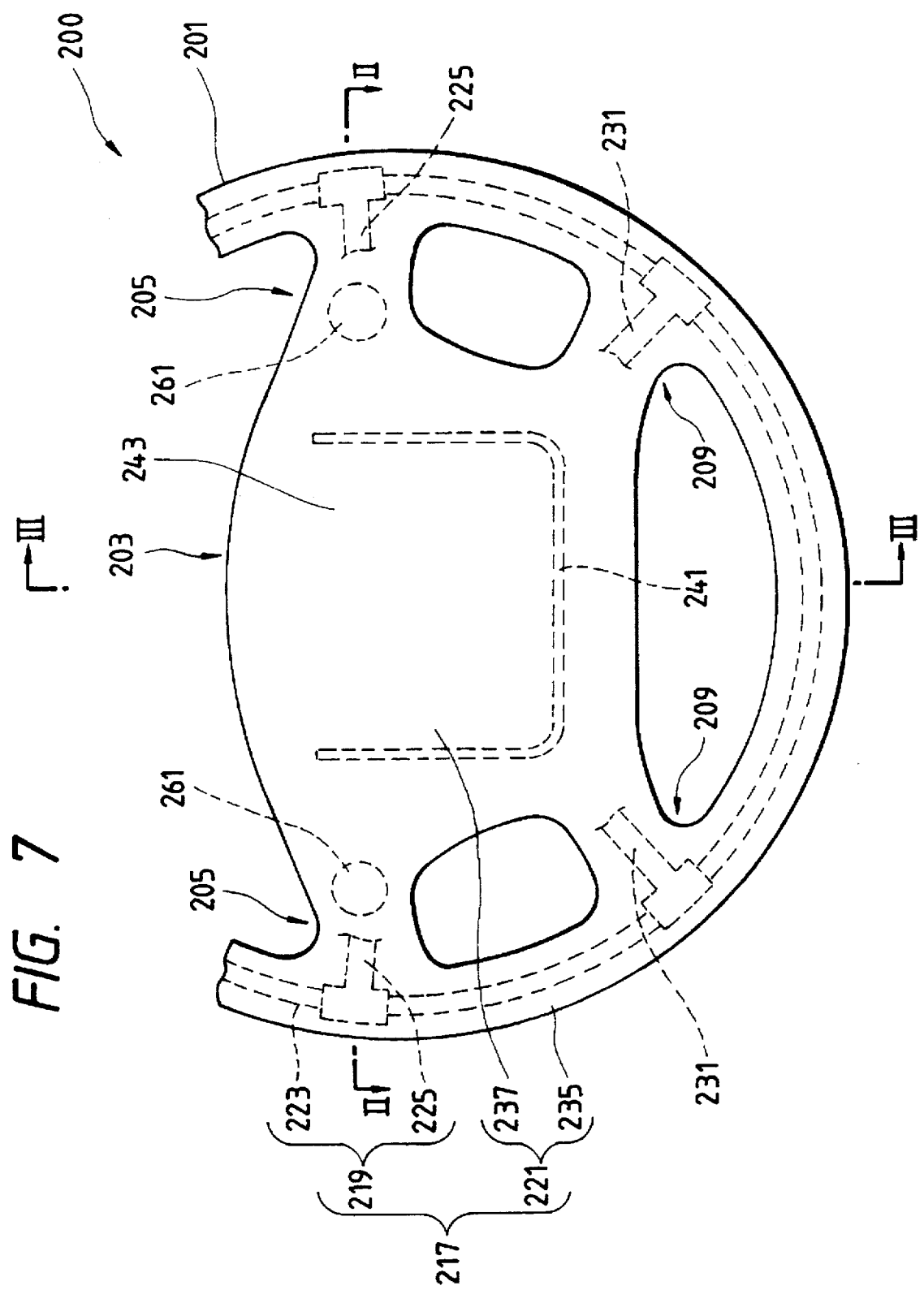
FIG. 7 is a plan view of a steering wheel of a third embodiment of the invention.

Although the steering wheel 1 of the first embodiment uses the bolts 55 for fixing the boss core 13 onto the steering wheel body 11, rivets may also be used to connect a boss core to a steering wheel body, as shown in FIGS. 4 to 6.

The steering wheel 2 of the second embodiment is constructed similarly to the steering wheel of the first embodiment, except for the structure related to the attachment by rivets. Common components between the embodiments are labeled with the same reference numbers. The differences between the embodiments are described below.

More particularly, as shown in FIG. 5, tongue pieces 91 are formed in the lower ends of spoke cores 23. The tongue pieces 91 extend downwardly. Each of the tongue pieces 91 is formed with a fitting hole 93 into which the rivet 95 is inserted. Corresponding structure is provided in the boss core 13. Three tongue pieces 97 are formed in a coupling ring 45 of a boss core 13. The tongue pieces 97 of the boss core 13 also extend downwardly. Each of the tongue pieces 97 is formed with a fitting hole 99 into which the rivet 95 is inserted. The boss core 13 is fitted onto the steering wheel body 11 by the rivets 95 inserted through the corresponding fitting holes 93 and 99. Because the tongues pieces 91 extend downwardly, the spoke cores 23 are easily subject to plastic deformation. Thus, shock energy applied to a ring portion 3 of a steering wheel of the second embodiment is absorbed by the plastic deformation of the tongue pieces.

In the second embodiment, the air bag 71 and the inflater 73 are secured to the boss core by an annular-shaped bag holder 101. As with the first embodiment, the inflater 73 includes a flange 83. Four bolts 103 extend downwardly from the flange 83. The bag holder 101 includes fitting holes 105 into which the bolts 103 of the inflater 73 are inserted. The bag holder 101 also includes holding holes 109 that can be positioned over holding holes 53 of the coupling ring 45. The bag holder 101 is fixed to the coupling ring 45 with rivets 107.

The aforementioned structure enables the air bag device 15 to be fitted to the boss core 13 only with the bag holder 101, facilitating holding of the air bag device 15 to the boss core 13. The rivets 107 are so-called blind rivets that can be mounted in a direction from the bottom face of the boss core 13. Bolts 103 extending downwardly from the flange 83 and passing through holes 105 may be secured to the bag holder 101 with nuts.

Unlike the steering wheel of the first embodiment, horn switches need not be disposed in the boss portion. Horn switches 111 may be placed in spoke portions 9 of a core cover layer 29. The horn switches 111 are a horn button type. When the core cover layer 29 is formed, the steering wheel body 11 is formed with recesses 113. Leads (not shown) are embedded in the core cover layer 29. The horn switches 111 are disposed in the recesses 113 and the leads of the horn switches 111 are connected to the embedded leads. Alternatively, to remove a parting line formed around the horn switches 111, horn switches of a membrane switch type may be substituted for the embedded switches 111.

A lower cover 115 for covering the lower side face of the boss portion 5 is provided for the steering wheel of the second embodiment. The cover 115 is retained with screws 117 that are screwed into holes 119 formed into the boss core 13.

To assemble the steering wheel of the second embodiment, the boss core 13 is secured to the steering wheel body 11 with the rivets 95, as described above. The horn switches 111 are then disposed in the recesses 113. Then the lower cover 115 is retained on the boss core 13 with the screws 117. As described in the first embodiment, a connection part 55 is used to connect the steering wheel to a steering shaft 7.

In the first and second embodiments, the steering shaft 7 is connected to the boss core 13 as described above. However, the connection part 55 may include any alternative structure that allows the upper end of the steering shaft 7 to be connected from underneath. Such structure could include a steering shaft formed with a fitting plate and screws retained with bolts, as described in Japanese Patent Publication No. Sho 63-134368 and Japanese Utility Model Publication Nos. Hei 2-24691 and 5-2388.

3rd Embodiment

A steering wheel of a third embodiment of the invention is shown in FIGS. 7 to 10. The steering wheel 200 comprises an annular-shaped ring portion 201 and a boss portion 203 disposed at the center of the ring portion 201. Two upper spoke portions 205 and two lower spoke portions 209, radially disposed from the boss portion 203, connect the ring portion 201 to the boss portion 203. In the third embodiment, the lower spoke portions 209 are not directly coupled to a boss core 227. As described below, the lower spoke portions 209 are directly coupled to a coupling plate 213 of an air bag device 215.

The ring portion 201, the spoke portions 205, 209 and the boss portion 203 define a steering wheel body 217. A functional part 215, such as an air bag device, is disposed in the boss portion 203.

More particularly, the steering wheel body 217 comprises a core portion 219 and a cover portion 221. The core portion 219 provides the structural shape of the steering wheel body. The cover portion 221 provides the exterior cover disposed on the core portion 219.

The core portion 219 includes a ring core 223 providing the inner structure element of the ring portion 201 and spoke cores 225 providing the inner structural elements of the spoke portions 205. The spoke cores 225 are radially disposed from and are connected at one end to the boss portion 203 unseparatably. The other ends of the spoke cores 225 are connected to the ring core 223. That is, the core portion 219 includes a bridging structure comprising the boss core 227 and the spoke cores connected to the both ends of the boss core 227.

Each spoke core 225 is disposed slantingly downwardly from the ring core 223. A lower end of each of the spoke cores 225 is laterally disposed and extends essentially horizontally and is coupled to a boss core 227. As described below, the spoke cores 225 are preferably integrally formed with the boss core 227. The lower end of the spoke cores 225 are formed with a vertically disposed fitting hole 229.

Similarly, the core portion 219 includes coupling members 231 providing the inner structural elements of the spoke portions 209. The coupling members 231 are radially disposed from and are connected at one end to the coupling plate 213. The other end of the coupling members are connected to the ring core 223. Each coupling member 231 also extends slantingly downwardly from the ring core 223. A lower end of each of the coupling members 231 is formed with a female threaded fitting hole 233.

Each of the spoke cores 225 and coupling members 231 is preferably made of light die-casting metal. The spoke cores 225 and coupling members 231 are coupled to the ring core 223 at the time the spoke cores 225 and coupling members 231 are die cast.

Figure 8:
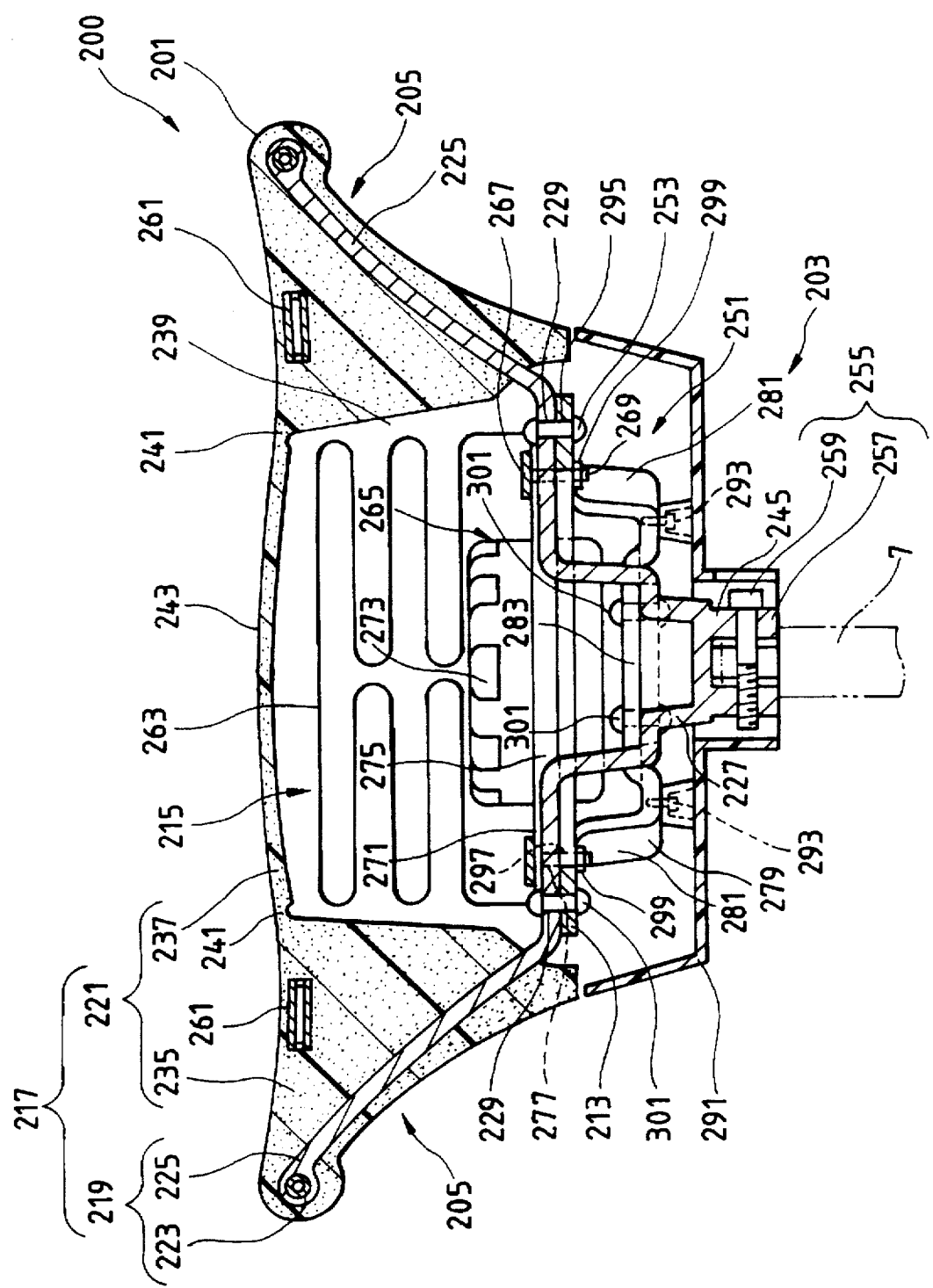
FIG. 8 is a longitudinal sectional view of the third embodiment of the invention taken along line II—II of FIG. 7.

The cover portion 221 is preferably made of soft urethane and thermoplastic elastomer. The cover portion 221 consists of a core cover layer 235 covering the ring core 223 and the spoke cores 225 and a ceiling cover layer 237 covering the boss portion 203. As shown in FIG. 8, the core cover layer 235 and the ceiling cover layer 237 are formed as a continuous layer, eliminating any parting line between the layers.

Also as shown in FIG. 8, the core cover layer 235 surrounds each of the spoke cores 225 and coupling members 231 and extends inwardly so as to define a cylindrical housing recess 239 inside of the spoke cores 225 and coupling members 231. The ceiling cover layer 237 joins the core cover layer 235 at a top surface of the core cover layer. The housing recess 239 accommodates the air bag device 215. The housing recess 239 is defined between the boss core 227, the core cover layer 235, and the lower face of the ceiling cover layer 237.

The ceiling cover layer 237 includes an easy-to-break breaking part 241 formed in the ceiling cover layer 237. The breaking part 241 is thinner than the surrounding portions of the ceiling cover layer 237. The breaking part 241 is constructed and arranged to shear apart under a force of an expanding air bag. Preferably, the breaking part 241 has a "U" shape. The U-shape essentially defines a door 243 through which the expanding bag can pass. The thicker portion of the ceiling cover layer 237 disposed above the U-shape provides a door hinge about which the door pivots.

Figure 10:
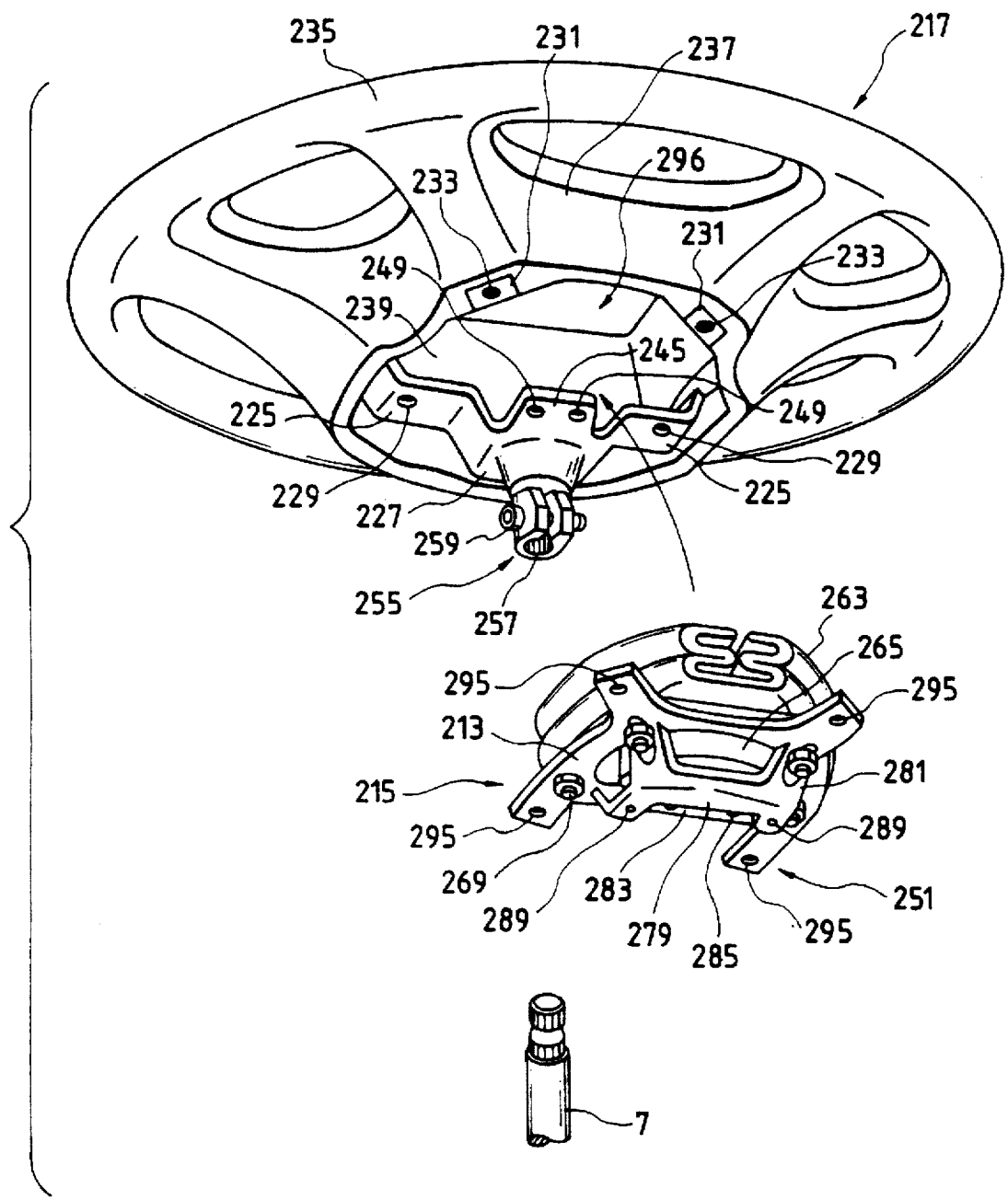
FIG. 10 is an exploded perspective view of a main part of the third embodiment of the invention.

Like the previous embodiments, the steering wheel of the third embodiment includes a boss core 227. As shown in FIGS. 8 and 10, the spoke cores 225 are integrally formed with the boss core 227. A lock plate 245 is projected from the rear of the boss core 227 and is formed with fitting holes 249. A frame 251 is secured to the lock plate 245 with rivets 253 passing through holes 249. As described below, the frame 251 supports the air bag device 215. Finally, the boss core 227 includes a connection part 255 disposed on the bottom face of the boss core 227. The connection part 255 allows a steering shaft 7 to be connected from underneath the steering wheel 200. The connection part 255 includes a split sleeve 257 and a lock pin 259 and has a structure similar to the split sleeve described in the first embodiment.

Horn switches 261 preferably constructed from membrane switches, are embedded in an upper portion of the core cover layer 235 between the ring core 223 and the housing recess 239. The horn switches 261 are set in an injection mold with the core portion 219 prior to injection molding. Thereafter, the cover portion 221 is injection molded over the horn switches 261 and the core portion 219. Leads (not shown) from each of the horn switches 261 are projected toward the housing recess 239 and the terminal ends of the leads are connected to a horn operation circuit.

The air bag device 215 includes a folded air bag 263, an inflater 265 for supplying gas to expand the air bag 263, and the frame 251 for securing the air bag 263 and the inflater 265 to the boss core 227. A retainer 267 is used to secure the inflater 265 to the frame 251. The retainer 267 has a substantially annular shape and includes four bolts 269 projected downwardly.

The air bag 263 includes an opening 271 disposed about the inflater 265 through which the gas from the inflater 265 flows. Disposed about the perimeter of the opening 271, the air bag 263 includes insertion holes (not shown) into which each of the bolts 269 of the retainer 267 is inserted.

The inflater 265 includes a main unit having a gas discharge port 273 on a top surface of the unit. An annular flange 275 is disposed on the outer peripheral surface of the inflater 265. Insertion holes 277 are formed into the flange 275 of the inflater 265 into which the bolts 269 of the retainer 267 are inserted.

The frame 251 is formed from light die-casting metal, such as an aluminum alloy, and comprises a substantially rectangular bottom plate 279, legs 281 extending upwardly from four corners of the bottom plate 279, and the coupling plate 213 having a substantially quadrangular annular shape coupled to the legs 281. The frame 251 is preferably formed as an integral unit.

Figure 9:
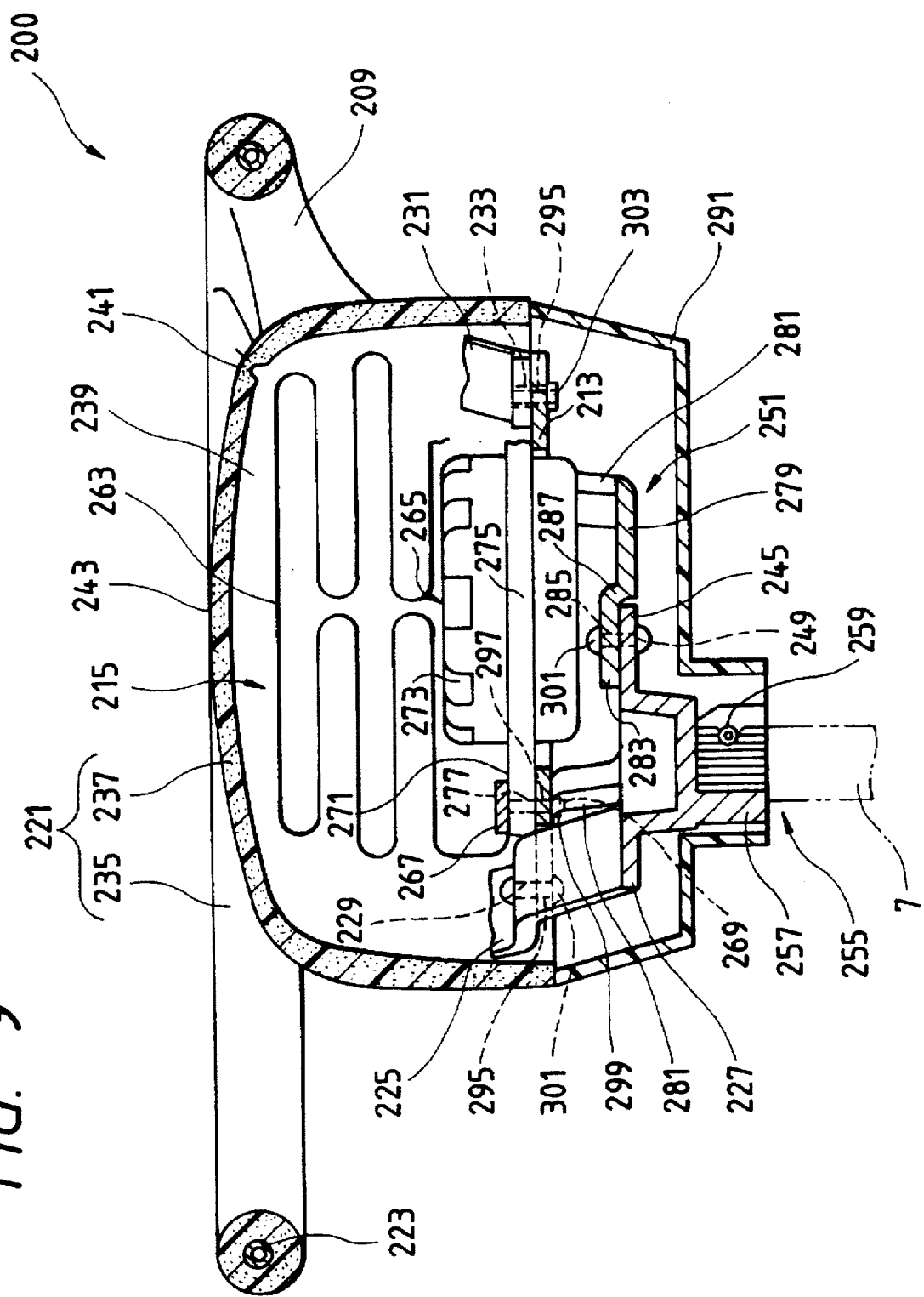
FIG. 9 is a longitudinal sectional view of the third embodiment of the invention taken along line III—III of FIG. 7.

As shown in FIG. 9, the bottom plate 279 is formed with a displaced part 283 provided by upwardly displacing the leading edge of the bottom plate 279. The displaced part 283 is formed with a pair of fitting holes 285 arranged to match with the fitting holes 249 of the boss core 227. When the air bag device 215 is disposed in the housing recess 239 of the steering wheel body 217, the displaced part 283 is positioned on the lock plate 245. At this position, as shown in FIG. 9, the rear end face of the lock plate 245 abuts a vertical surface 287 on the bottom plate 279 at the boundary between the displaced part 283 and the remaining bottom plate 279. Thereby, the vertical surface 287 positions the air bag device 215.

A pair of screw holes 289 for retaining a lower cover 291 is provided in the bottom plate 279. The lower cover 291 is made of synthetic resin. The lower cover 291 is adapted to cover the lower portion of the boss portion 203. Screws 293 secure the lower cover 291 to the bottom plate 279 by mounting the cover 291 to the holes 289.

As shown in FIG. 10, the coupling plate 213 is formed with fitting holes 295 positioned to match to the fitting holes 229 and 233 of the spoke cores 225 and the coupling members 231. Insertion holes 297 (best seen in FIG. 8), into which bolts 269 of the retainer 267 are inserted, are formed near the legs 281.

To assemble the air bag device 215, the retainer 267 is placed inside the air bag 263 and, thereafter, the bolts 269 are inserted into the insertion holes (not shown) of the air bag 263, the insertion holes 277 of the inflater flange 275, and the insertion holes 297 of the frame 251. The assembly is retained by securing the bolts 269 with nuts 299.

To manufacture the steering wheel 200 of the third embodiment, the core portion 219 and the horn switch 261 are first inserted into an injection mold, and the cover portion 221 is formed by injection molding, as described above.

Next, the air bag device 215 is housed in the housing recess 239 through an opening 296 formed between the cover portion 221 and the boss core 227. At this time, when the displaced part 283 of the frame bottom plate 279 is placed on the top face of the lock plate 245 of the boss core 227, the outer peripheral surface of the lock plate 245 abuts the vertical surface 287 of the bottom plate 279, and the frame 251 is positioned with respect to the steering wheel body 217. The fitting holes 229 and 233 of the spoke cores 225 and the coupling members 231 mate to the fitting holes 295 of the frame 251. As well, the fitting holes 249 of the boss core 227 mate to the fitting holes 285 of the frame 251.

Rivets 301 are then inserted into the fitting holes 229, 295, 249 and 285 to fasten the spoke cores 225 and the boss core 227, respectively, to the frame 251. Bolts 303 are inserted through the fitting holes 295 and are screwed into the fitting holes 233, thereby securing the coupling members 231 to the frame 251.

As with the previous embodiments, the steering wheel of the third embodiment can be connected to the steering shaft 7 by executing one step. Finally, the lower cover 291 is secured by screws 293 to the frame 251.

In the steering wheel 200 of the third embodiment, the air bag device 215 is coupled by bolts 303 to the coupling member 231. That is, the air bag device 215 is coupled not only to the boss core 227 and the spoke cores 225, but also to the coupling members 231. Such structure enhances the rigidity of the frame 251 and air device 215 assembly, so that it can be supported stably by the steering wheel body 217.

Further, in the third embodiment, the frame 251, is made of rigid metal. The coupling members 231, which are not directly coupled to the boss core 227, are coupled via the frame 251 to the boss core 227. This structure also contributes to enhancing the rigidity of the coupling members 231.

In the third embodiment, the steering wheel 200 having four spoke portions is shown. Alternatively, a steering wheel which has three spoke portions could also be provided. Such a steering wheel would include upper spoke portions 205 and a single lower spoke portion disposed below the upper spoke portions 205. The single lower spoke portion would be constructed as spoke portions 209. This steering wheel would be able to produce the above-mentioned rigidity if the core of the lower spoke is a coupling member coupled to the frame 251, as in the first embodiment.

4th Embodiment

Figure 11:
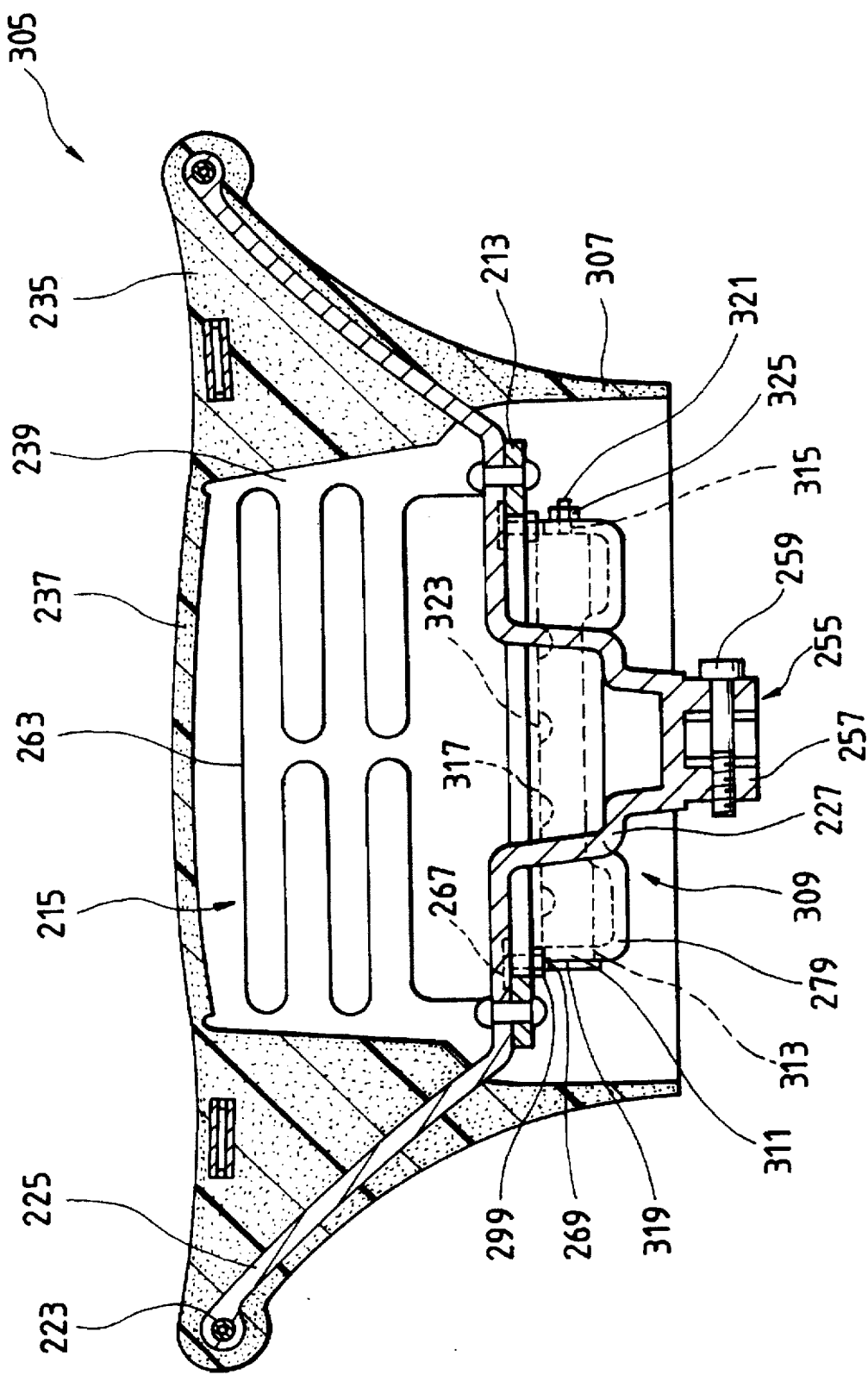
FIG. 11 is a sectional view of a steering wheel of a fourth embodiment of the invention.
Figure 12:
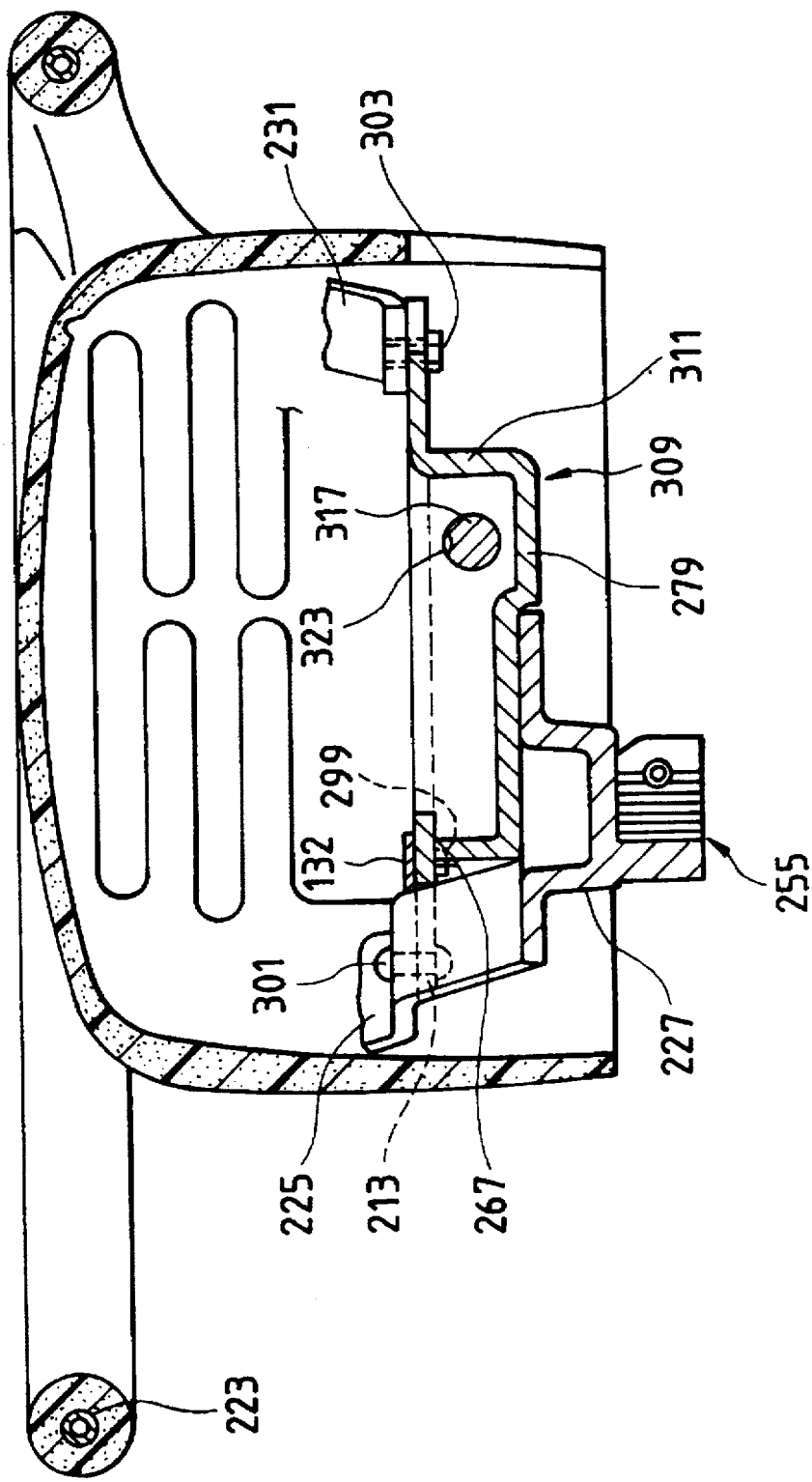
FIG. 12 is a longitudinal sectional view of the fourth embodiment of the invention taken along a plane perpendicular from a state shown in FIG. 11.

As shown in FIGS. 11 and 12, a fourth embodiment of the present invention is constructed similarly to the third embodiment. The fourth embodiment, however, eliminates the need for a lower cover 291 and is adapted to use a cylinder-type inflater.

To replace the lower cover 291, a cover 307 is formed in the lower peripheral edge of the core cover layer 235. The cover 307 extends sufficiently low to surround the boss core 227.

As described above, the steering wheel 200 of the third embodiment uses a disk-type inflater. By comparison, the steering wheel 305 of the fourth embodiment uses a cylinder-type inflater. To adapt the frame so that it can accommodate a cylinder-type inflater, a frame 309 comprises a peripheral wall 311, functioning like the legs 281 of the third embodiment, having a contiguous surface in the circumferential direction. The peripheral wall 311 is formed with insertion holes 313 and 315 for mounting an inflater 317.

The inflater 317 is formed with a flange 319 on one end and male threads 321 on the other end. The inflater 317 includes a gas discharge port 323.

To attach the air bag device 215 to the frame 309, the inflater 317 is inserted into the insertion holes 313 and 315 such that the flange 319 abuts the peripheral edge of the insertion hole 313 and the discharge port 323 is directed towards the air bag. A nut 325 is screwed onto the male threads 321 to secure the inflater 317 to the frame 309.

5th Embodiment

Referring now to FIGS. 13 to 21, a fifth embodiment of the invention will be described.

Figure 13:
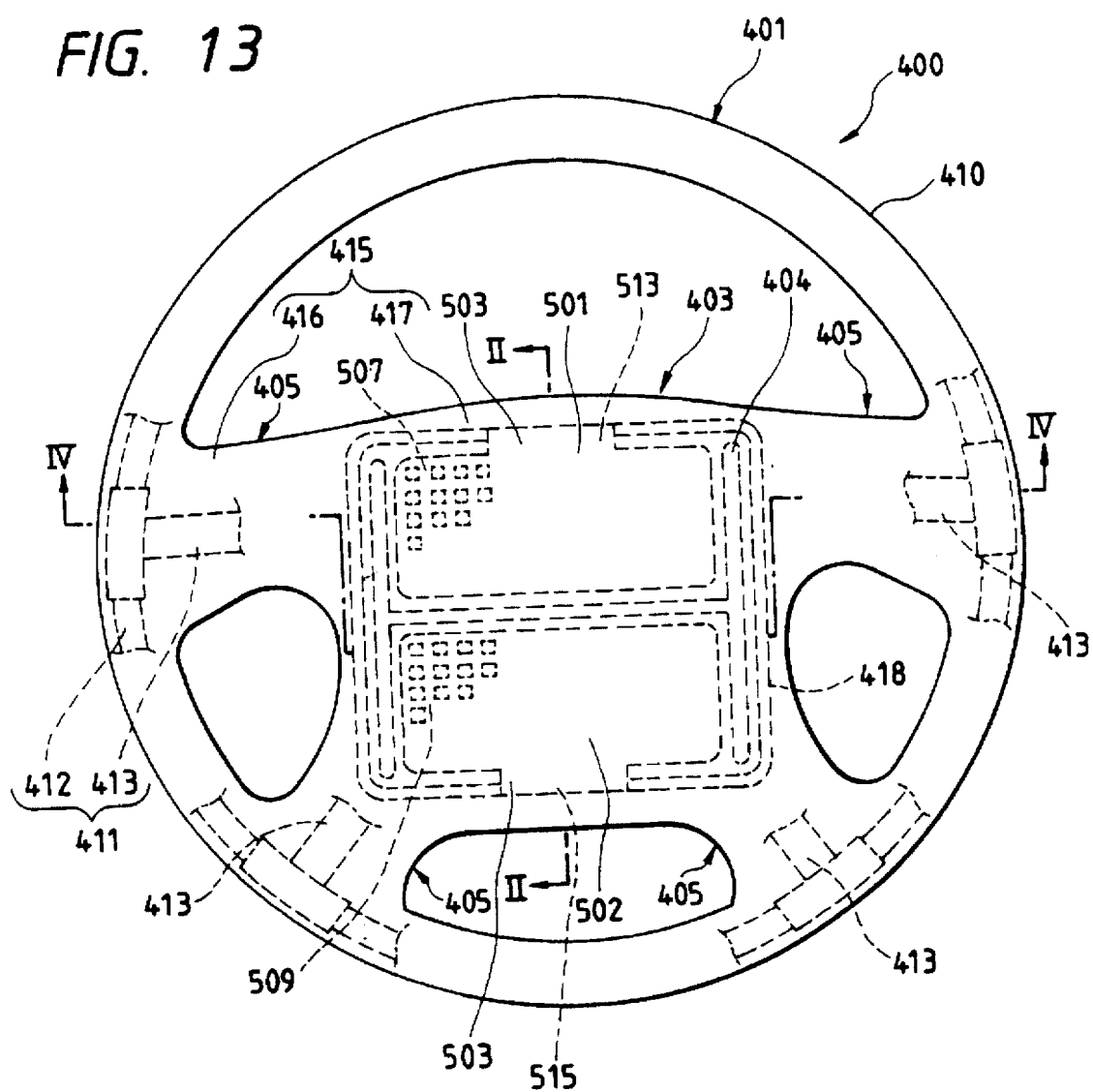
FIG. 13 is a plan view of a steering wheel of a fifth embodiment of the invention.
Figure 19:
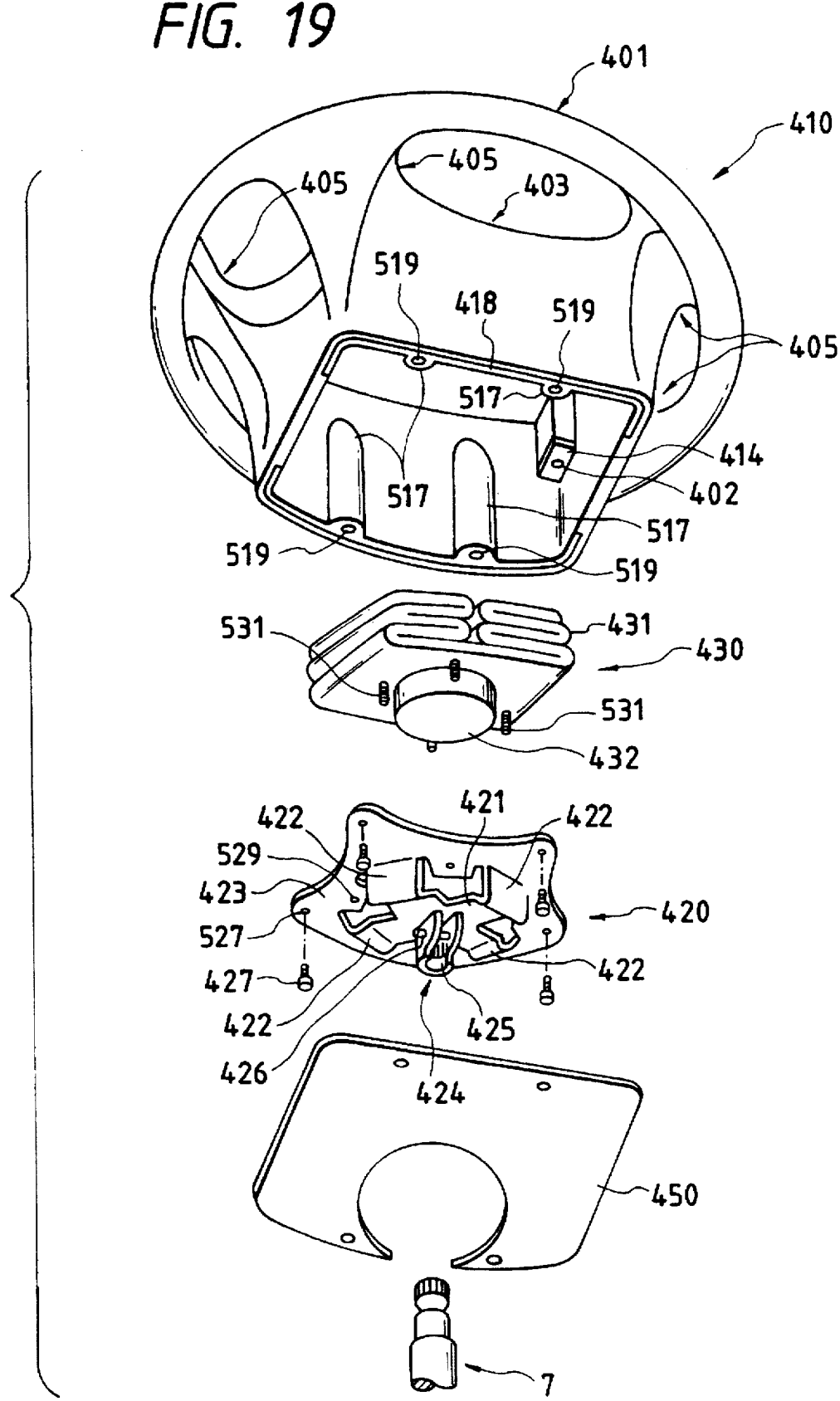
FIG. 19 is an exploded perspective view of the fifth embodiment of the invention.

A steering wheel 400 of the fifth embodiment of the present invention comprises an annular ring portion 401 and a boss portion 403 disposed at the center of the ring portion 401. Three spoke portions 405, as shown in FIGS. 13 and 19, radially disposed from the boss portion 403, connect the ring portion 401 to the boss portion 403 as similarly done in the first embodiment.

The ring portion 401, the spoke portions 405, and the upper part of the boss portion 403 define a steering wheel body 410. A boss core 420 is disposed in a lower part of the boss portion 403, and an air bag device 430 is held by the boss core 420, as shown in FIGS. 13, 14, 16 and 19.

More particularly, the steering wheel body 410 comprises a core portion 411 made of metal and a cover portion 415 made of soft synthetic resin. The core portion 411 provides the structural shape of the steering wheel body. The cover portion 415 provides the exterior cover disposed on the core portion.

The core portion 411 includes a ring core 412 providing the inner structural element of the ring portion 401 and spoke cores 413 providing the inner structural elements of the spoke portions 405. The spoke cores 413 are radially disposed from and are connected at one end to the boss 420. The other end of the spoke cores 413 are connected to the ring core 412. Each spoke core 413 is disposed slantingly downwardly from the ring core 412. An end of each of the spoke cores 413 includes a lateral plate 414. The lateral plate 414 defines a threaded fitting hole 402.

Figure 16:
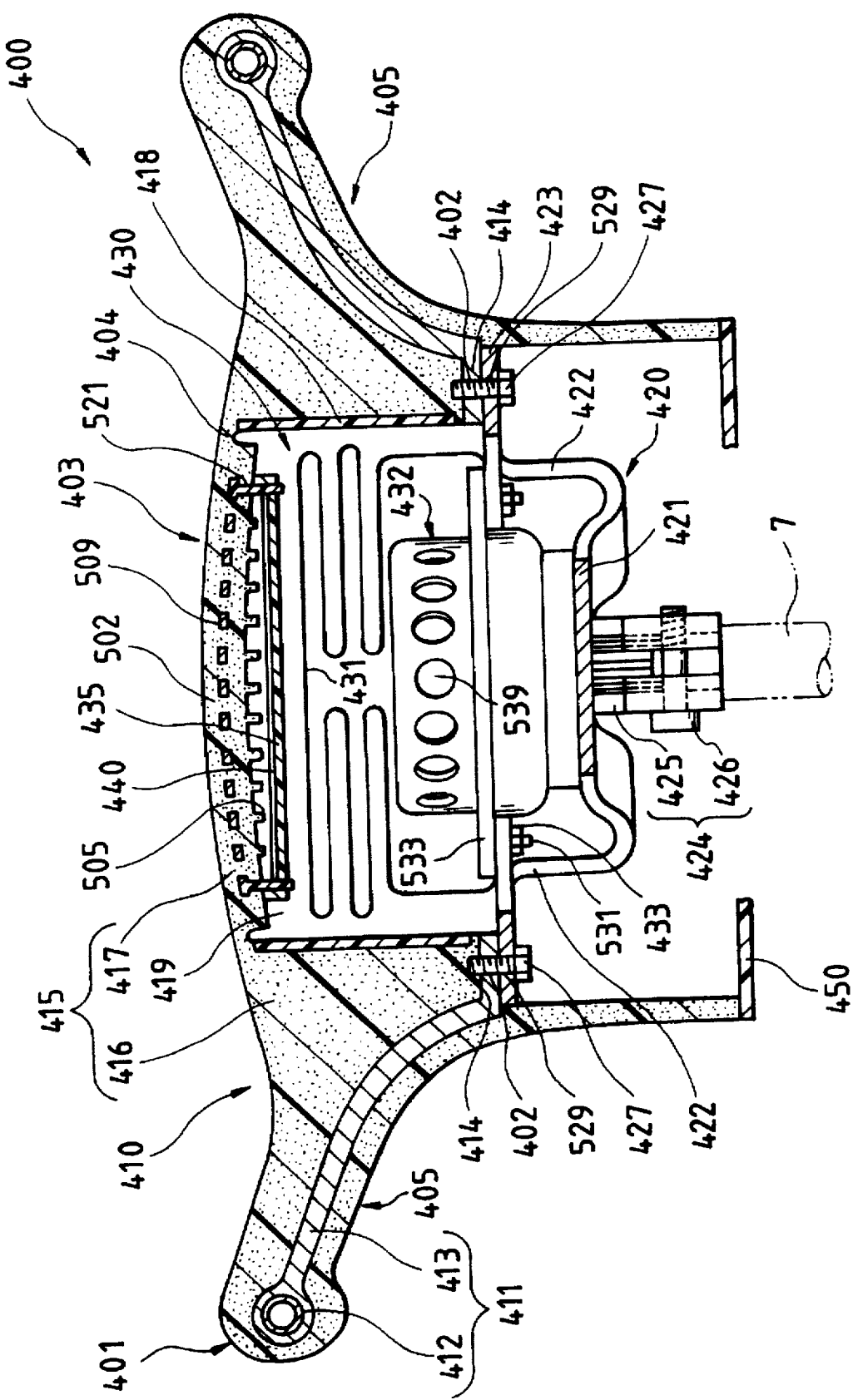
FIG. 16 is a sectional view of the fifth embodiment of the invention taken along line IV—IV of FIG. 13.

As similarly constructed in the first embodiment, the cover portion 415 comprises a core cover layer 416 covering the ring core 412 and a ceiling cover layer 417 covering the upper part of the boss portion 403. As shown in FIG. 16, the core cover layer 416 and the ceiling cover layer 417 are formed as a continuous layer, eliminating any parting line between the layers.

As shown in FIG. 16, the core cover layer 416 surrounds the ring core 412 and each of the spoke cores 413 and extends inwardly so as to define a cylindrical space inside of the spoke cores 413. The ceiling cover layer 417 joins the core cover layers 416 at a top surface of the core cover layer 416. Thus, a cylindrical housing recess 419 is defined by the core cover layer 416 and the ceiling cover layer 417, in much the same way as described in the first embodiment.

The ceiling cover layer 417 includes two doors 501 and 502 configured to open like a double-leafed hinged door when an air bag 431 is deployed. The doors 501 and 502 are formed by an easy-to-break, breaking part 404 defining the peripheral edges of the doors 501 and 502. The breaking part 404 is formed in the ceiling cover layer 417 and is thinner than the portions of the ceiling cover layer 417 adjacent to the breaking part 404. The breaking part 404 is constructed and arranged to shear apart under a force of an expanding air bag. Preferably, the breaking part 404 is formed like the letter "H" as viewed from above. The thicker portion above the door 501 and the thicker portion below the door 502 provide hinges 503 about which the doors 501 and 503 pivot. The ceiling cover layer 417 also includes a plurality of press ribs 505 capable of pressing a membrane switch 440, as described below. The press ribs 505 are projected at predetermined positions from the bottom face of the door 502.

As shown in FIGS. 13, 14, 16, and 19, an insert 418 is embedded in the cover portion 415. The insert 418 includes net-like ceiling portions 507 and 509 embedded in the doors 501 and 502, a substantially quadrangular cylindrical base 511 disposed on the surface of the core cover layer defining the recess 419, and flexible coupling parts 513 and 515 embedded in the hinges 503 for coupling the ceiling portions 507 and 509 to the base 511. The insert 418 is integrally molded from synthetic resin such as a thermoplastic elastomer selected from an olefin family, styrene family or polyester family having higher tensile strength than the ceiling cover layer 417 and core cover layer 416. The coupling parts 513 and 515 are thinner than the base 511 so as to provide flexibility, yet thick enough to oppose a tractive force when the doors 501 and 502 open as the air bag 431 deploys.

As shown in FIGS. 18 and 19, four fitting boss portions 517 having fitting holes 519 are formed on the inner peripheral surface of the base 511 of the insert 418. A lower cover 450 is secured to the insert 418 by screws inserted into the fitting holes 519. As shown in FIG. 18, the insert 418 also includes a plurality of fitting projections 521 extending from the ceiling portion 509. The fitting projections 521 are constructed and arranged to support a support plate 435. The membrane switch 440 configured as a horn switch is disposed on the support plate 435.

The support plate 435 includes fitting holes 438 disposed about the perimeter of the plate 435. The support plate 435 is fixed to the ceiling portion 509 by inserting the fitting projections 521 into the fitting holes 438 and heating, melting, swelling, or otherwise fixing the lower ends of the fitting projections 521 such that the ends cannot pass back through the filling holes 438 (thereby executing a so-called thermal caulking).

Figure 15:
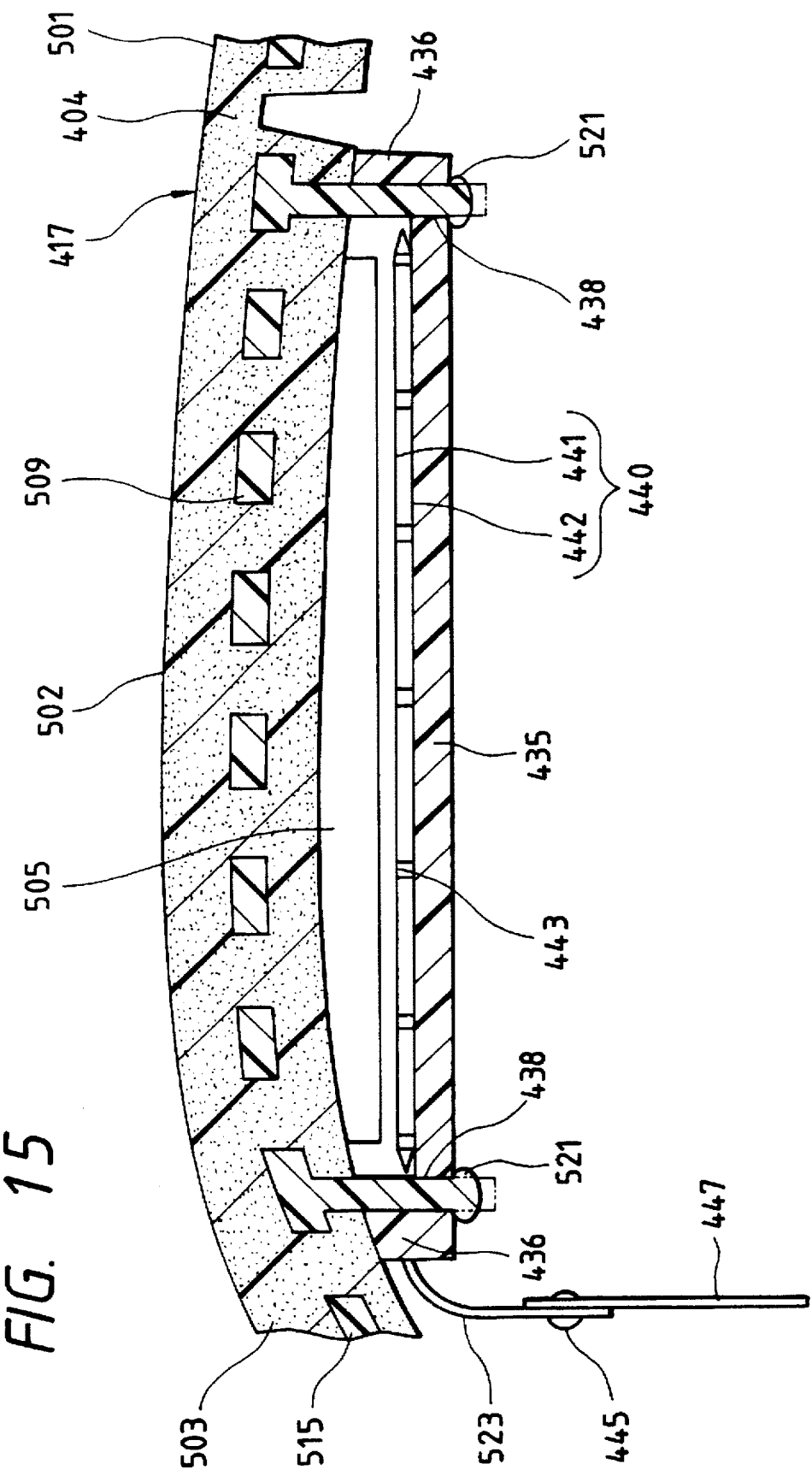
FIG. 15 is a partially enlarged view of FIG. 14.
Figure 17:
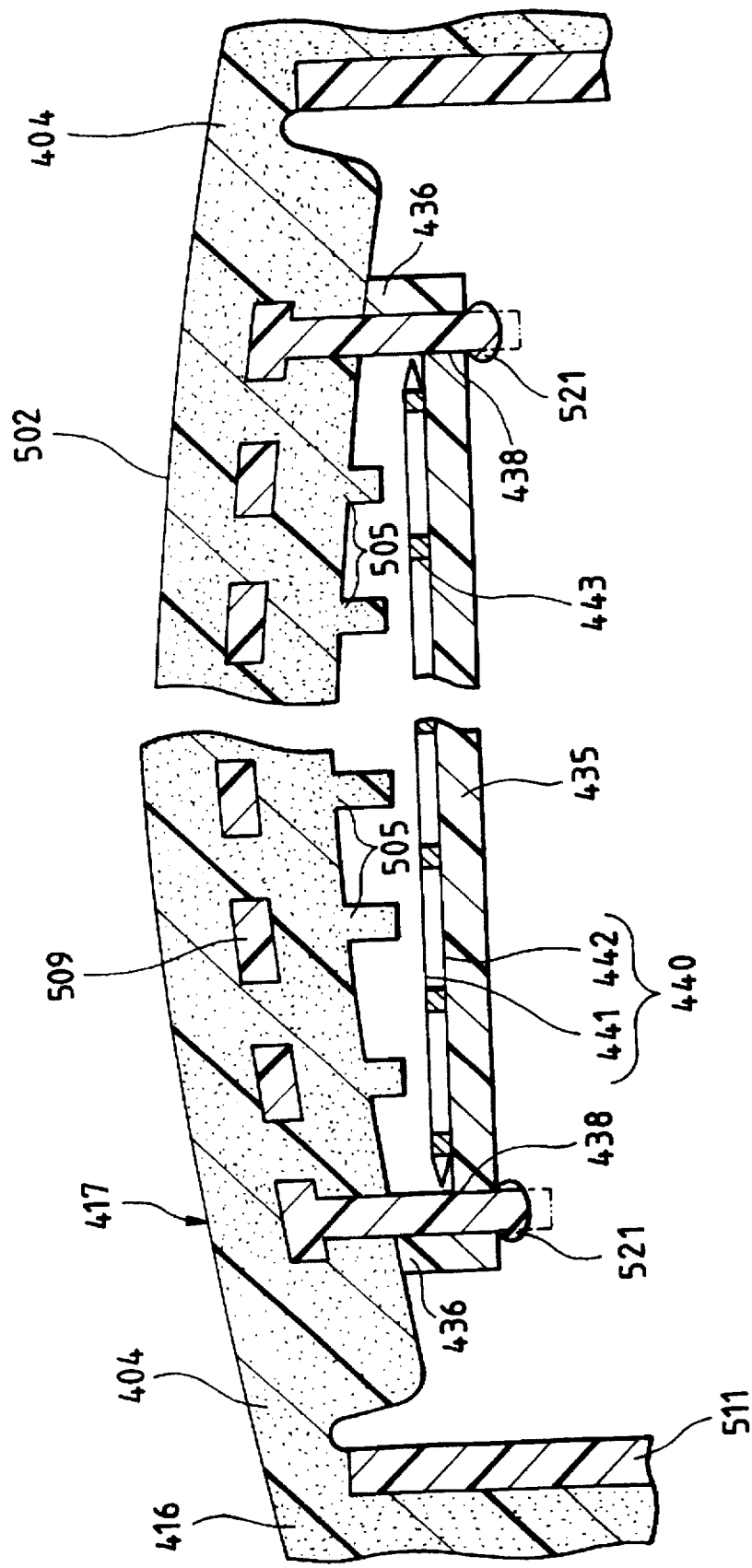
FIG. 17 is a partially enlarged view of FIG. 16.
Figure 20:
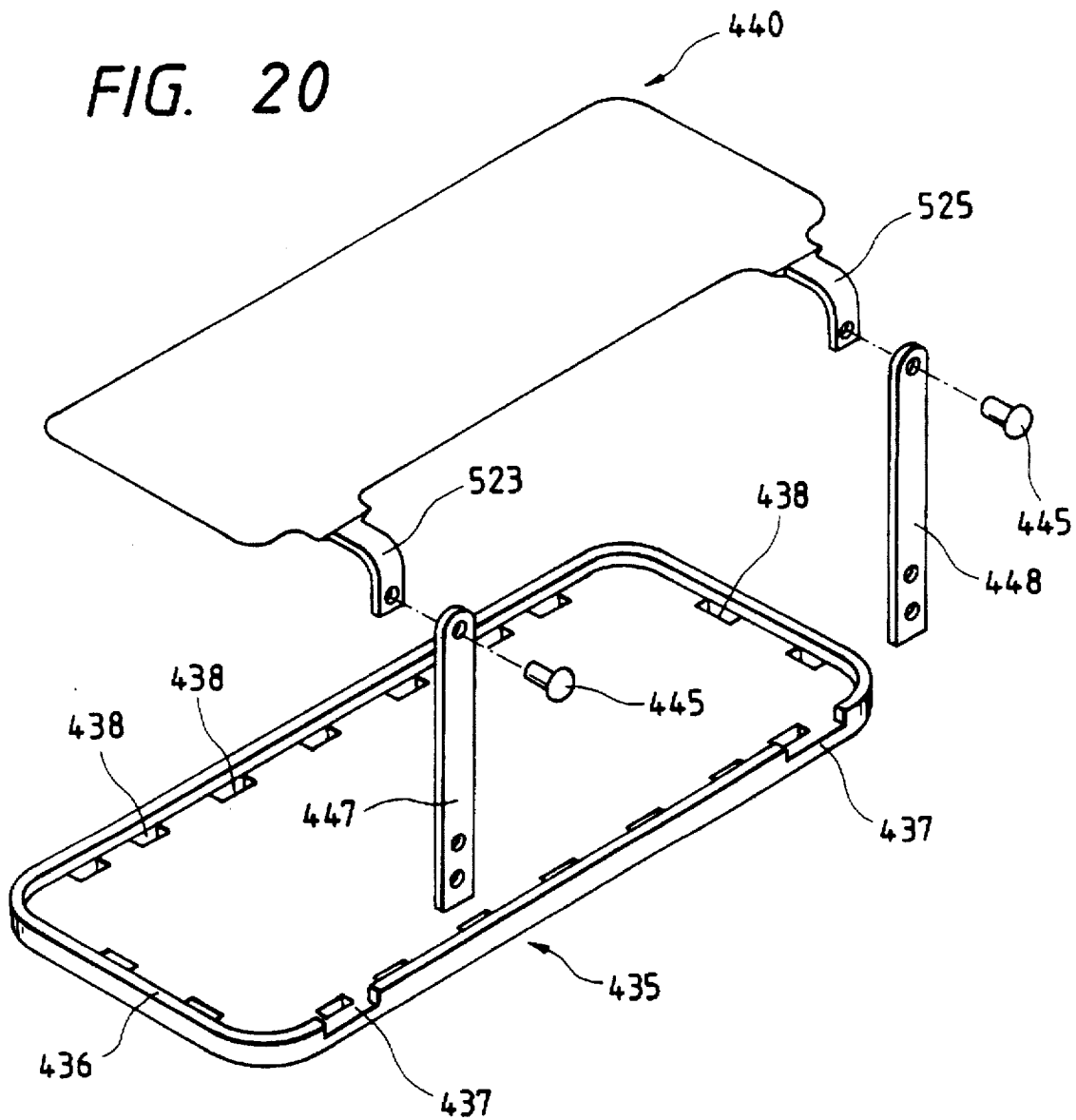
FIG. 20 is an exploded perspective view of a horn switch used with the fifth embodiment of the invention.

As shown in FIGS. 15, 17, and 20, the support plate 435 is formed of a synthetic resin such as polypropylene or a thermoplastic elastomer taken from the olefin family, styrene family, or polyester family having a higher rigidity than the inserter 418. Interval regulation projections 436 are projected from the outer peripheral edge of the support plate 435. The interval regulation projections 436, as described below, define the stroke of the ceiling cover layer 417 that activates the horn switch. Preferably, the fitting holes 438 are disposed near the interval regulation projections 436. As shown in FIG. 20, terminals 523 and 525 of the membrane switch 440, as described below, are disposed in recesses 437 formed in the interval regulation projections 436.

The membrane switch 440 includes an upper plate 441, preferably made of phosphor bronze, a lower plate 442, preferably made of stainless steel, disposed below the upper plate 441, and insulation spacers 443, preferably made of a flexible insulating material, disposed between the upper plate 441 and the lower plate 442. The terminals 523 and 525 are projected from predetermined positions on the membrane switch 440 corresponding to recesses 437. Connection plates 447 and 448, made of a conductive material, are retained on the terminals 523 and 525 with rivets 445 and are connected to the electrodes of a horn operation circuit. Preferably, the membrane switch 440 is covered by a protective film covering the plates 441 and 442. Further, the spacers 443 are preferably spaced regularly from each other at equal intervals.

As shown in FIG. 17, the press ribs 505 are extended at increasing lengths from the door 502 of the ceiling cover layer 517 such that the space between each of the press ribs 505 and the upper plate 441 is the same. With this configuration, the load needed to activate the membrane switch 440 is the same at all positions on the door 502. This configuration also provides a uniform activation stroke by compensating for the curvature of the ceiling cover layer 417.

Figure 14:
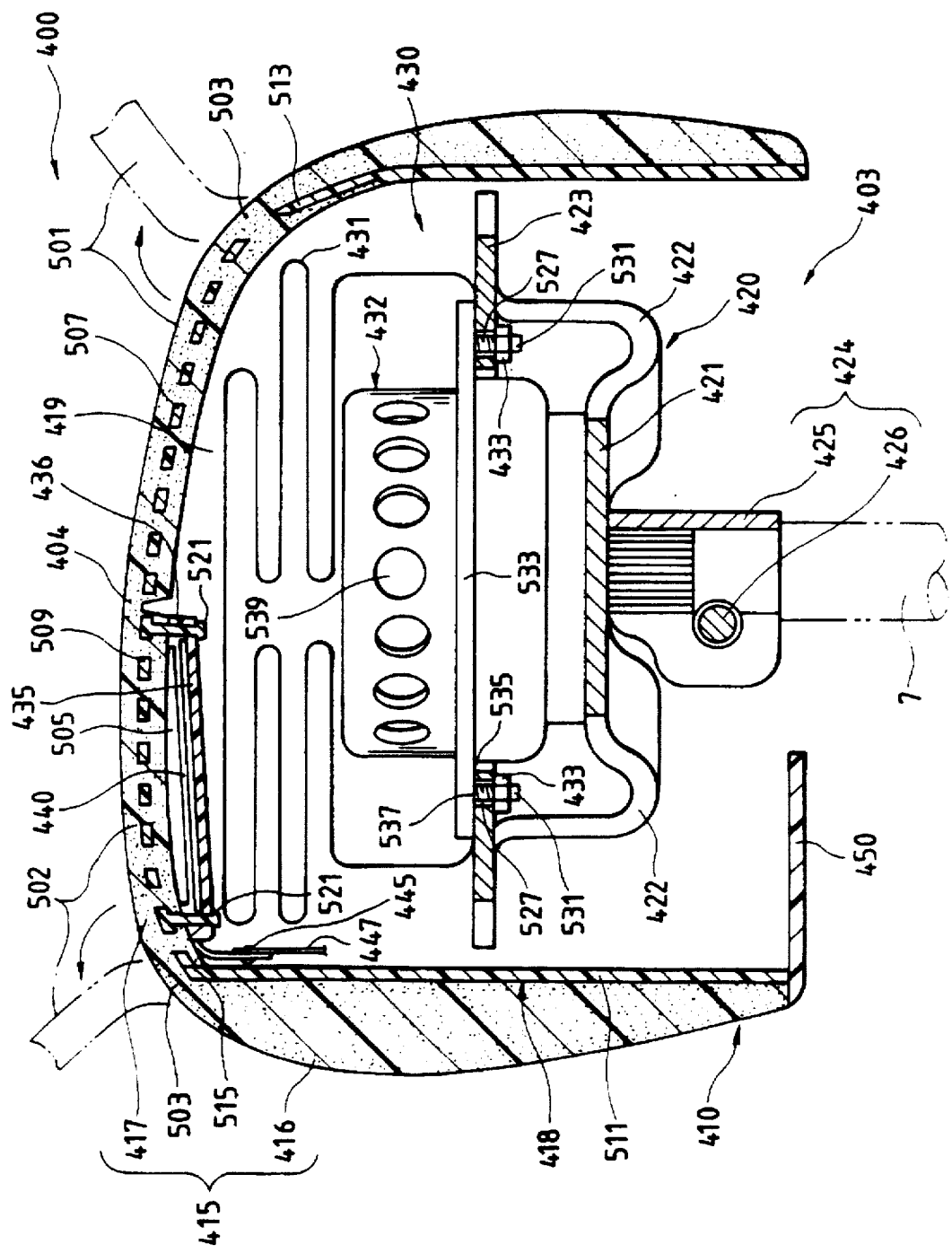
FIG. 14 is a longitudinal sectional view of the fifth embodiment of the invention taken along line II—II of FIG. 13.

As shown in FIGS. 14, 16, and 19, the boss core 420 includes a base 421 at its center, an annular-shaped coupling ring portion 423 disposed above the base 421, and four plastically deformable deformation parts 422 coupling the base 421 to the coupling ring portion 423. The boss core 420 is preferably made from a light and extendable die-casting metal, such as an aluminum alloy. The boss core 420 is also preferably constructed as a continuous or integral unit.

The coupling ring portion 423 is formed with fitting holes 527 into which bolts 427 are inserted. The holes 527 are formed at positions corresponding to the fitting holes 402 of the spoke cores 413. Four holding holes 529 are also formed in the coupling ring portion 423 into which bolts 531 extending from an inflater 432, as described below, are inserted.

As described in the previous embodiments, a connection part 424 is disposed below the base 421 to allow the steering wheel shaft 7 to be connected from underneath. The connection part includes a split sleeve 425 and a lock pin 426. The connection part 424 is constructed and arranged as previously described.

As shown in FIGS. 14, 16, and 19, the air bag device 430 includes a folded air bag 431 and an inflater 432 for supplying gas to the air bag 431 to deploy the air bag 431. The inflater 432 includes a flange 533 having four bolts 531 disposed downwardly from the flange 533. The air bag device 430 is secured to the boss core 420 by passing the four bolts 531 of the flange 432 through the holes 423 of the boss core 420.

As shown in FIG. 14, the air bag 431 has an opening 535 through which the gas from the inflater 432 flows and insertion holes 537 into which the bolts 531 of the inflater 432 are inserted. The insertion holes 537 are formed around the peripheral edge of the opening 535.

The inflater 432 includes a main unit having a gas discharge port 539 disposed on a top surface of the main unit.

To assemble the air bag 431 to the inflater 432, the inflater 432 is placed inside of the air bag 431 and the bolts 531 are inserted into the insertion hole 537 of the air bag 431 and the holding holes 529 of the boss core. The inflater 432 is retained by securing the bolts 531 with nuts 433.

To manufacture the steering wheel of the fifth embodiment, the core portion 411 and the insert 418 are first set in an injection mold. Then, the cover portion 415 is formed over the core portion 411 and the insert 418 by injection molding, thereby forming the steering wheel body 410. The bolts 531 of the inflater 432 and the nuts 433 are used to secure the air bag device 430 to the boss core 420, as described above.

The support 435 and the membrane switch 440 are placed on the bottom face of the insert ceiling portion 509. The fitting projections 521 are then inserted into the fitting holes 438 and thermally caulked, as described above, thereby mounting the membrane switch 440 to the steering wheel body 410. The connection plates 447 and 448 are retained on the membrane switch 440 by the rivets 445.

Figure 21:
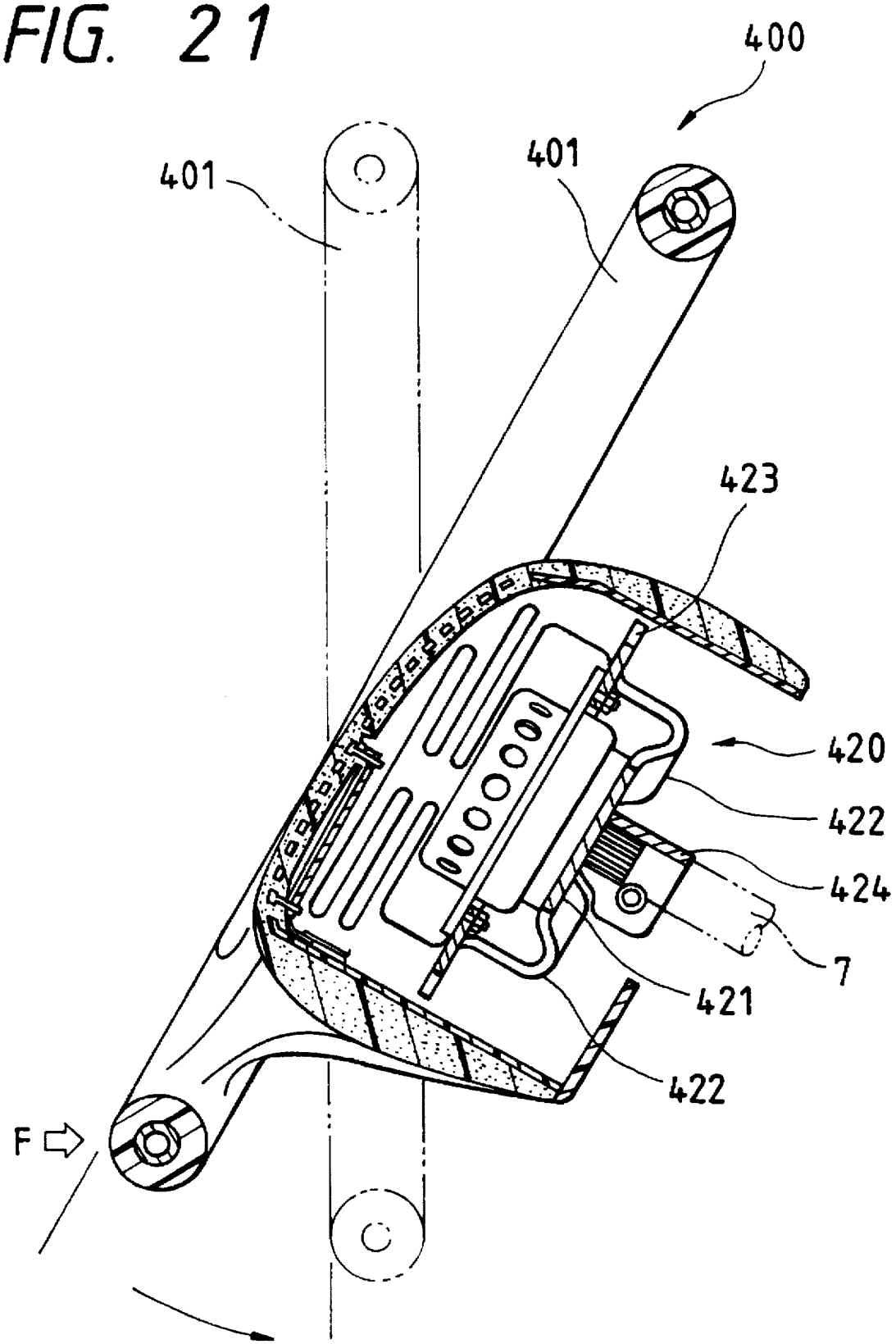
FIG. 21 is an illustration showing a state in which an impulsive force acts on a ring portion of the fifth embodiment of the invention.
Figure 22:
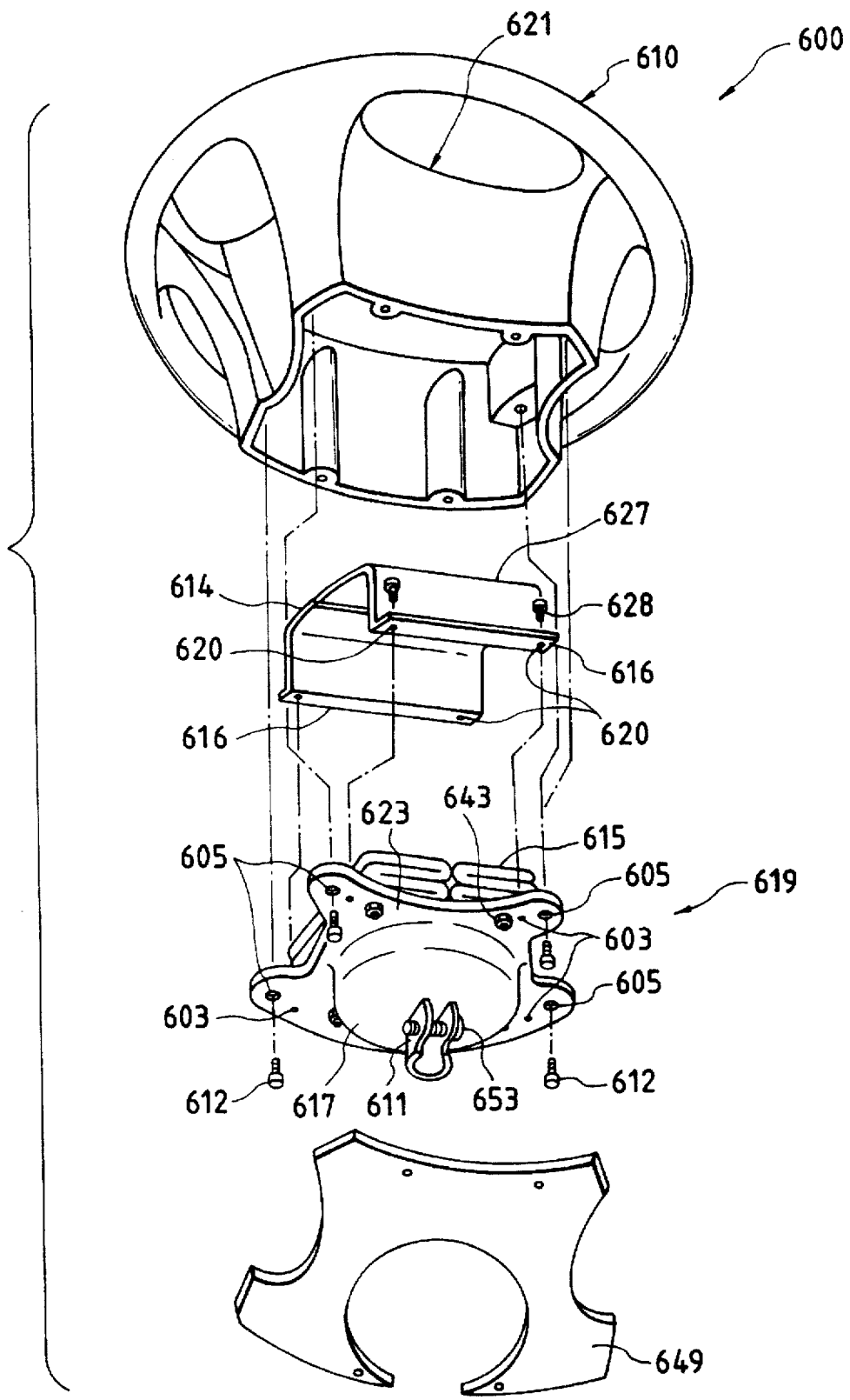
FIG. 22 is an entire exploded perspective view of a sixth embodiment of a steering wheel of the invention viewed from underneath.

Next, the fitting holes 527 of the boss core 420 are aligned with the fitting holes 402 of the steering wheel body 410. The bolts 427 are screwed into the fitting holes 402 through the fitting holes 527. Finally, the lower cover 450 is secured to the fitting boss portions 517 of the insert 418. In the steering wheel 400 of the fifth embodiment, if an impulsive force F acts on the ring portion 401, as shown in FIG. 21, after connection to the steering shaft 7, the deformation parts 422 of the boss core 420 are plastically deformed thereby providing a self-aligning mechanism. During such deformation, the ring portion 401 is positioned substantially orthogonal to the direction of the impulsive force F thereby absorbing the impulsive force F over a wider area than would otherwise be provided without the self-aligning function.

When gas is discharged from the gas discharge port 539 of the inflater 432 and the air bag 431 deploys, the breakable part 404 of the ceiling cover layer 417 is broken allowing the doors 501 and 502 to open. When the door 502 opens, the terminals 523 and 525 of the membrane switch 440 are flexed and the support plate 435 and the membrane switch pivot with the door 502 as a unit.

Given that the air bag device 430 is secured to the boss core 420 by securing the flange 533 of the air bag device 430 to the coupling ring portion 423, the air bag device 430 can be built into a steering wheel without using a conventional retainer or bag holder. Additionally, the number of components can be reduced. Moreover, even though the steering wheel 400 of the fifth embodiment is provided with a self-aligning mechanism and an air bag device, the number of manufacturing steps and the manufacturing costs are not increased.

Although the steering wheel 400 of the fifth embodiment uses the bolts 427 as the fixing means for securing the boss core 420 in the steering wheel body 410, rivets may be used. Likewise, rivets, as well as the bolts, may be used to connect the flange 533 of the inflater 432 of the air bag device 430 to the coupling ring portion 423 of the boss core 420.

Alternatively, insertion holes may be made in the inflater flange 533 and a conventional retainer provided with retainer bolts can replace the bolts 531. In this case, a conventional bag holder is still not required and the number of parts can still be reduced.

6th Embodiment

Referring now to FIGS. 22 to 26, there is shown a sixth embodiment of the present invention.

A steering wheel 600 according to the sixth embodiment of the present invention has an air bag device 619 having a folded air bag 615 and an inflater 617 disposed above a boss core 611. The boss core 611 is positioned at the center of the steering wheel and is coupled to a steering shaft 613. The steering wheel further includes a ceiling cover layer 621 disposed above the air bag device 619, and preferably includes a horn switch mechanism.

Figure 24:
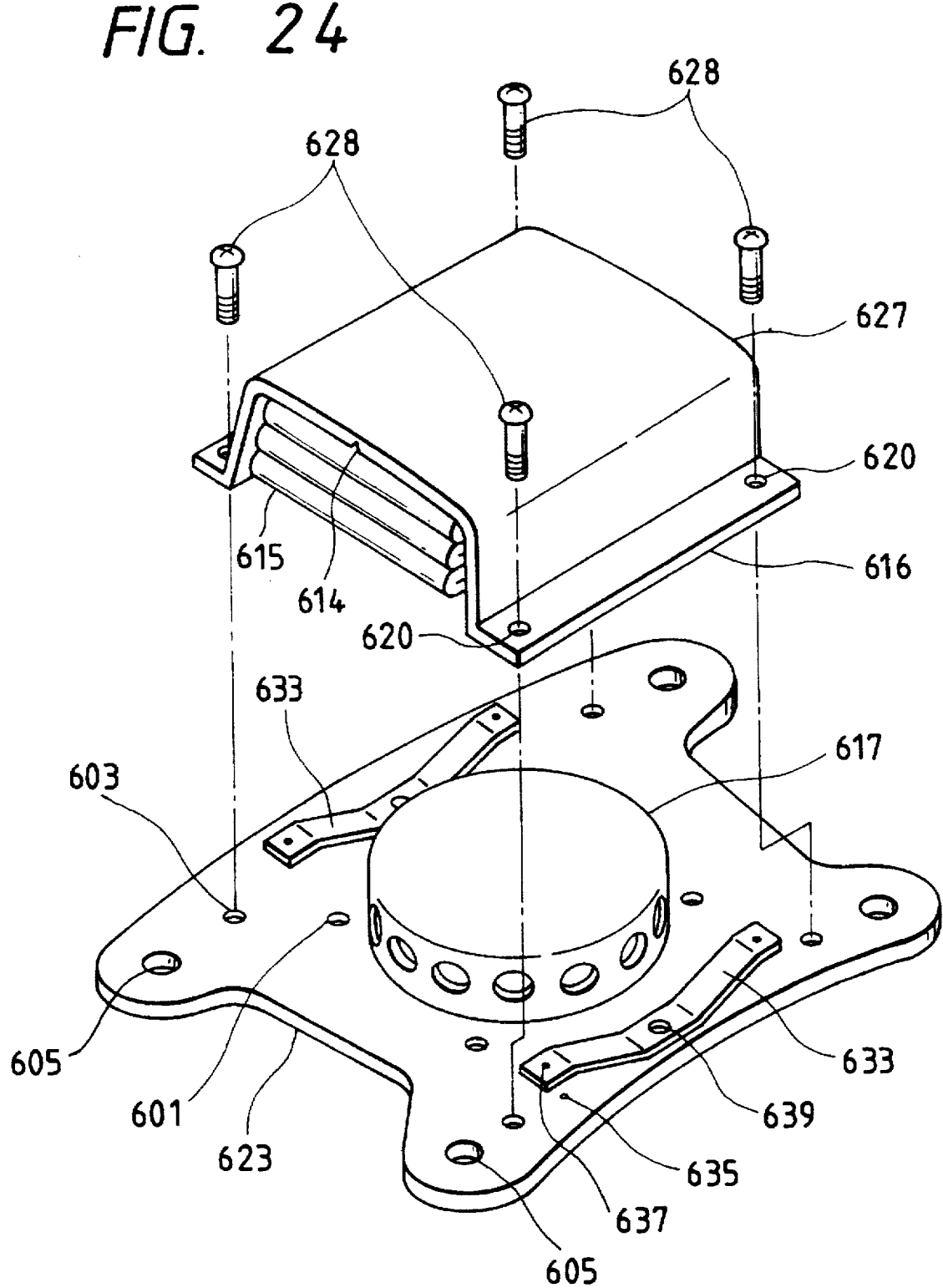
FIG. 24 is an exploded perspective view of a main unit of the steering wheel of the sixth embodiment of the invention viewed from above.
Figure 25:
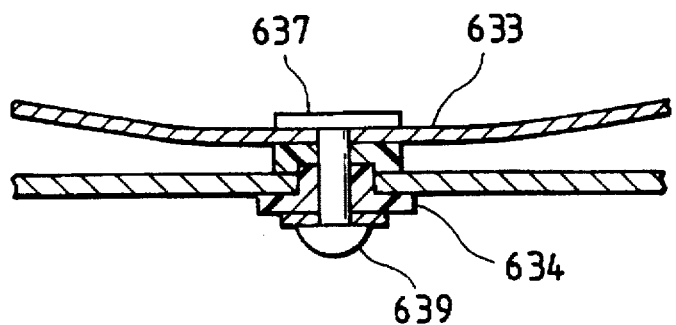
FIG. 25 is a sectional view of a main unit of an angle plate spring installation part shown in FIG. 24.
Figure 26:
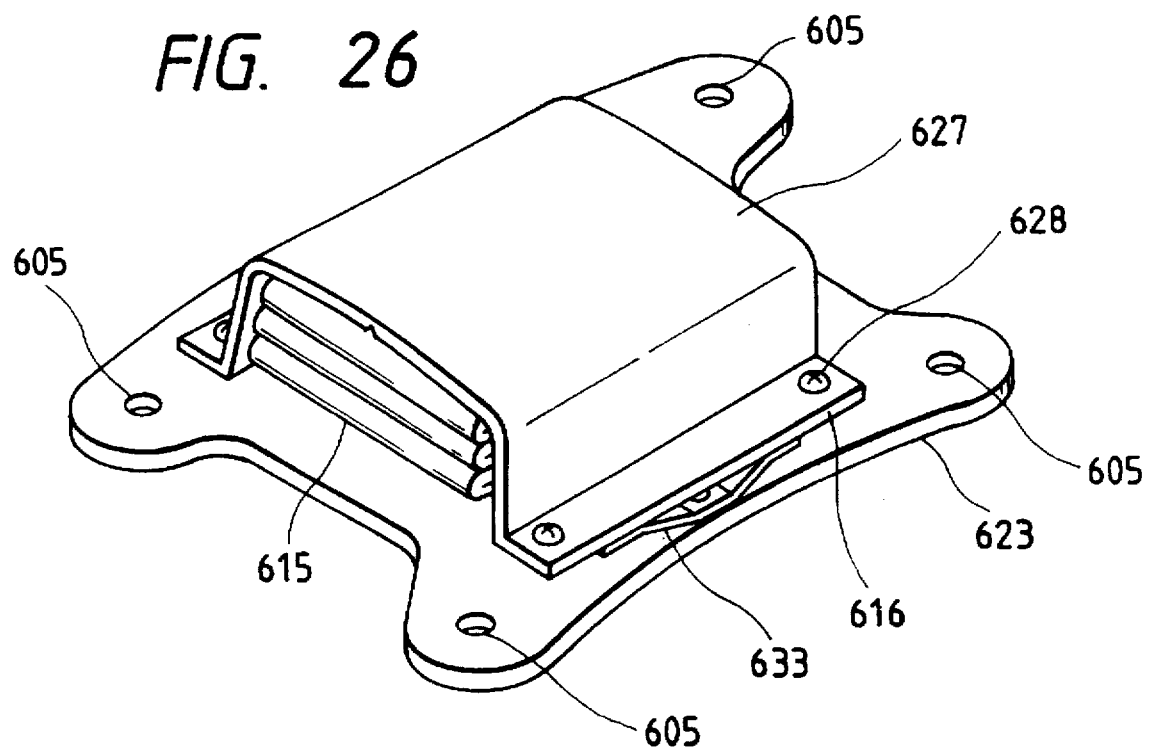
FIG. 26 is a perspective view of an assembly shown in FIG. 24.

In this embodiment, the boss core 611 is integrally formed on the bottom of the inflater 617 such that a boss plate 623 is formed on the bottom of the inflater 617. The boss plate 623 provides a flange of the inflater 617. In other words, the bottom of the inflater 617 serves as both the boss plate 623 and the inflater flange thereby making installation of the inflater 617 to a boss core substantially unnecessary. As best seen in FIG. 24, the boss plate 623 is formed with bottom face projection bolt holes 601, guide bolt holes 603, and main unit fitting bolt holes 605.

The boss core 611 and the bottom of the inflater 617 (containing the flange) may be integrally die-casted or may be formed as separate bodies and then integrated by welding or an adhesive. Although the boss core 611 and the inflater 617 are concentrically disposed, as preferably illustrated, they can be eccentrically disposed to improve gauge visibility.

Figure 23:
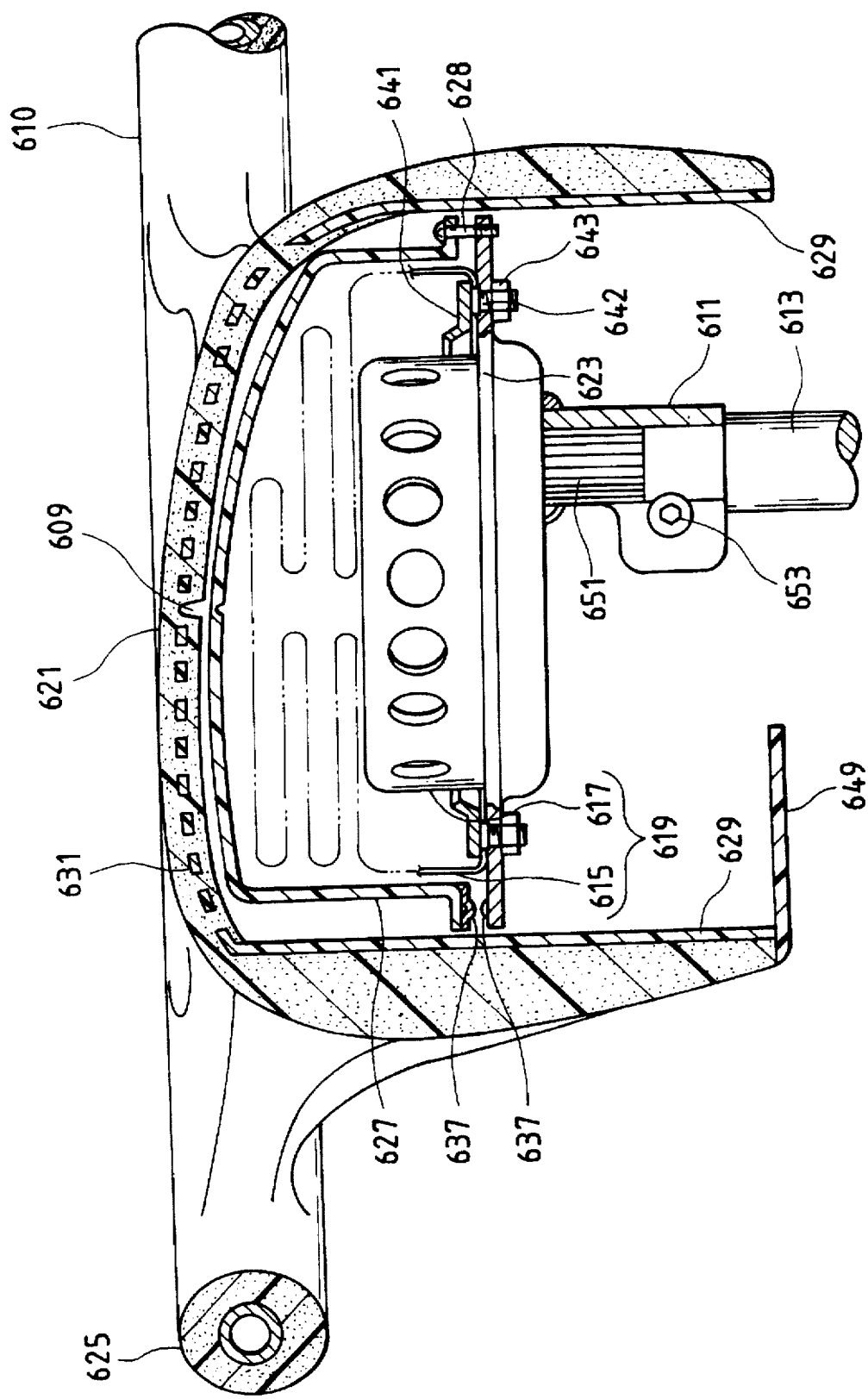
FIG. 23 is a schematic sectional view of assembly of the steering wheel of the sixth embodiment of the invention.

As shown in FIG. 23, the air bag 615 is secured to the boss core 611 by a retainer 641. The retainer 641 includes bolts 642 disposed downwardly from the retainer 641. The retainer 641 is inserted into the air bag 615, as similarly described with the previous embodiments, and is secured to the boss core by securing nuts 643 to the bolts 642.

As with the previous embodiments, this embodiment adopts a structure in which the ceiling cover layer 621 is molded integrally with a cover portion 625 of a steering wheel body 610. Preferably, a press plate 627 is disposed just below the ceiling cover layer 621.

The cover portion 625 is normally formed of a soft foam polyurethane resin. The ceiling cover layer 621 is formed with a thin breakable part 609 that shears apart when the air bag is deployed. The ceiling cover layer 621 has a shape holding insert 629 disposed against a peripheral wall of the cover layer and a crush prevention net insert 631 embedded in a ceiling portion of the ceiling cover layer 621.

The press plate 627 is formed as a substantially rigid body. The press plate 627 has a groove (part to be broken) 614 to be broken when the air bag 615 swells. As shown in FIG. 23, the press plate straddles the air bag 615. The press plate 627 is preferably opened in a lateral direction, but may also be cylindrical. The press plate 627 is fitted to the boss plate 623 by four guide bolts 628. The press plate 627 is molded preferably from a hard plastic material that is easily broken, such as polyamide.

As shown in FIG. 24, flanges 616 are formed on lower ends of both side walls of the press plate 627. A pair of inverse angle plate springs 633 is located between the flanges 616 and the boss plate 623. The bottom of each inverse angle plate spring 633 is retained on the boss plate 623 with a rivet 639 via an insulator 634. Further, movable contacts 635 are formed on the bottom face of both ends of each inverse angle plate spring 633 and fixed contacts 637 are formed on the boss plate 623 as contact pairs. With this configuration, the press plate 627 and the spring 635 and contacts 635, 637 assembly provide a horn switch. The top surface of the press plate is contoured to correspond to the inner surface of the ceiling cover layer 621. This configuration provides a uniform activation force needed to activate the horn switch.

Alternatively, coil spring guide bolts 628 can replace the inverse angle plate springs 633. The movable contacts 635 may alternatively be formed directly in the flanges 616 of the press plate 627.

Bolt holes 620 for the guide bolts 628 are formed on both ends of the flange 616.

Next, assembly of the steering wheel with the air bag device having the foregoing structure will be discussed.

First, the bottom face bolt 642 of the ring retainer 641 is inserted into the bolt hole 601 of the boss plate 623. Then, the folded air bag 615 is retained with the nut 643. Consequently, the air bag device 619 including the air bag 615 and the inflater 617 can be easily mounted.

Next, the press plate 627 is disposed to straddle the top of the air bag 615 so that the flanges 616 are positioned on the horn switch mechanism containing the inverse angle plate springs. The press plate 627 is fitted to the boss plate 623 with the guide bolts 628. Finally, a lower cover 649 is mounted to the boss core 611, and the boss core 611 is fitted to the steering shaft 613.

While the invention has been described in connection with what are presently considered to be the most practical and preferred embodiments, it is to be understood that the invention is not to be limited to the disclosed embodiments, but on the contrary, is intended to cover various modifications and equivalent arrangements included within the spirit and scope of the appended claims.

What is claimed is:

1. A steering wheel having a ring portion, a boss portion disposed inside of the ring portion, and a plurality of spoke portions connecting the ring portion to the boss portion, the steering wheel comprising:

a core portion comprising a ring core providing a structural shape of the ring portion and a plurality of spoke cores providing a structural shape of the spoke portions disposed radially inwardly from the ring core;

a cover portion disposed around the core portion, the cover portion comprising a core cover layer covering the ring core and the spoke cores and a ceiling cover layer connected to an upper surface of the core cover layer such that a housing recess is defined inside of the core cover layer and below the ceiling cover layer;

a boss core coupled to the plurality of spoke cores, the boss core being connectable to a steering shaft such that the steering wheel can be connected to the steering shaft when the boss core is connected to the spoke cores; and a functional part fixed to the boss core and disposed within the housing recess.

2. The steering wheel as claimed in claim 1, wherein the functional part is an air bag device comprising an air bag and an inflater for supplying gas to the air bag to deploy the air bag.

3. The steering wheel as claimed in claim 2, wherein the air bag device further comprises a frame connected to the plurality of spoke cores and the boss core for holding the air bag and the inflater.

4. The steering wheel as claimed in claim 1, wherein the housing recess is formed with an opening and the functional part is inserted into the opening.

5. The steering wheel as claimed in claim 1, wherein the core portion further comprises a coupling member connected to said ring core and not directly coupled to said boss core.

6. The steering wheel as claimed in claim 5, wherein the functional part is coupled to the boss core and coupling member.

7. The steering wheel as claimed in claim 1, wherein the boss core comprises:

a base having a connection part disposed on a lower part of the base;

a coupling ring disposed above the base and coupled to the plurality of spoke cores; and a deformation part that can be plastically deformed connecting the base to the coupling ring.

8. The steering wheel as claimed in claim 7, wherein the functional part is an air bag device comprising an air bag and an inflater for supplying gas to the air bag to deploy the air bag, the inflator having a main unit and a flange formed on an outer peripheral surface of the main unit, a peripheral edge of an opening of the air bag and the flange of the inflater being coupled to the coupling ring thereby fixing the air bag device to the boss core.

9. A steering wheel having a ring portion, a boss portion disposed inside of the ring portion, and a plurality of spoke portions connecting the ring portion to the boss portion, the steering wheel comprising:

(1) a core portion comprising:

a ring core providing a structural shape of the ring portion; and a bridging structure including a pair of spoke cores providing a structural shape of the spoke portions disposed radially inwardly from the ring core and a boss core connectable to a steering shaft such that the steering wheel can be connected to the steering shaft;

wherein the spoke cores are located at the both ends of the bridging structure and the boss core is located at the center of the bridging structure and connects the pair of spoke cores;

(2) a cover portion disposed around the core portion, the cover portion comprising a core cover layer covering the ring core and the spoke cores and a ceiling cover layer connected to an upper surface of the core cover layer such that a housing recess is defined inside of the core cover layer and between the ceiling cover layer and the boss core; and (3) a functional part fixed to the bridging structure and disposed within the housing recess.

10. A steering wheel as claimed in claim 9, wherein the housing recess comprises an opening formed between the cover portion and the bridging portion and the functional part is inserted into the housing recess through the opening.

11. The steering wheel as claimed in claim 10, wherein the functional part is an air bag device comprising an air bag and an inflater for supplying gas to the air bag to deploy the air bag.

12. The steering wheel as claimed in claim 11, wherein the core portion further comprises a coupling member connected at one end to the ring core.

13. The steering wheel as claimed in claim 12, wherein the coupling member is connected to the bridging structure.

14. The steering wheel as claimed in claim 13, wherein the coupling member has a free end and the free end is connected to the bridging structure through the functional part.

* * * * *